United States Patent
Tan et al.

(10) Patent No.: US 11,580,851 B2
(45) Date of Patent: Feb. 14, 2023

(54) SYSTEMS AND METHODS FOR SIMULATING TRAFFIC SCENES

(71) Applicant: UATC, LLC, Mountain View, CA (US)

(72) Inventors: Shuhan Tan, Austin, TX (US); Kelvin Ka Wing Wong, Vancouver (CA); Shenlong Wang, Urbana, IL (US); Sivabalan Manivasagam, Toronto (CA); Mengye Ren, Toronto (CA); Raquel Urtasun, Toronto (CA)

(73) Assignee: UATC, LLC, Mountain View, CA (US)

( * ) Notice: Subject to any disclaimer, the term of this patent is extended or adjusted under 35 U.S.C. 154(b) by 0 days.

(21) Appl. No.: 17/528,277

(22) Filed: Nov. 17, 2021

(65) Prior Publication Data

US 2022/0157161 A1    May 19, 2022

Related U.S. Application Data

(60) Provisional application No. 63/114,848, filed on Nov. 17, 2020.

(51) Int. Cl.
*G06V 10/00* (2022.01)
*G08G 1/01* (2006.01)
*G06V 20/54* (2022.01)
*G06K 9/62* (2022.01)

(52) U.S. Cl.
CPC ......... *G08G 1/0133* (2013.01); *G06K 9/6277* (2013.01); *G06V 20/54* (2022.01); *G08G 1/0129* (2013.01)

(58) Field of Classification Search
CPC .... G08G 1/0133; G08G 1/0129; G06V 20/54; G06K 9/6277
USPC ........................................................ 701/117
See application file for complete search history.

(56) References Cited

U.S. PATENT DOCUMENTS

| | | | |
|---|---|---|---|
| 2020/0134494 A1* | 4/2020 | Venkatadri | B60W 40/10 |
| 2020/0302161 A1* | 9/2020 | Sriram | H04N 5/247 |
| 2020/0363800 A1* | 11/2020 | Jojo-Verge | G05D 1/0212 |
| 2020/0410062 A1* | 12/2020 | O'Malley | G05D 1/0088 |
| 2020/0410063 A1* | 12/2020 | O'Malley | G07C 5/02 |
| 2021/0049243 A1* | 2/2021 | Venkatadri | G06F 16/2379 |
| 2021/0279640 A1* | 9/2021 | Tu | G06N 3/0454 |
| 2021/0312244 A1* | 10/2021 | Atsmon | G06N 20/00 |

(Continued)

OTHER PUBLICATIONS

Bando et al., "Dynamical model of traffic congestion and numerical simulation." Physical review E 51, No. 2, 1995, p. 1035.

(Continued)

*Primary Examiner* — Tyler J Lee
*Assistant Examiner* — Tiffany P Ohman
(74) *Attorney, Agent, or Firm* — Dority & Manning, P.A.

(57) ABSTRACT

Example aspects of the present disclosure describe a scene generator for simulating scenes in an environment. For example, snapshots of simulated traffic scenes can be generated by sampling a joint probability distribution trained on real-world traffic scenes. In some implementations, samples of the joint probability distribution can be obtained by sampling a plurality of factorized probability distributions for a plurality of objects for sequential insertion into the scene.

20 Claims, 12 Drawing Sheets

(56) References Cited

U.S. PATENT DOCUMENTS

2022/0101074 A1* 3/2022 Peters ................ G06N 3/0472

OTHER PUBLICATIONS

Bengio et al., "Modeling high-dimensional discrete data with multilayer neural networks." Advances in Neural Information Processing Systems 12, 1999, 7 pages.
Best et al., "Efficient simulation of the von Mises distribution." Journal of the Royal Statistical Society: Series C (Applied Statistics) 28, No. 2, 1979. pp. 152-157.
Binkowski et al., "Demystifying mmd gans." arXiv preprint arXiv:1801.01401, 2018, 36 pages.
Bishop et al., "Pattern recognition and machine learning". vol. 4, No. 4. New York: springer, 2006, 11 pages.
Chandler et al., "Traffic dynamics: studies in car following." Operations research 6, No. 2, 1958, pp. 165-184.
Chang et al., "Argoverse: 3d tracking and forecasting with rich maps." In Proceedings of the IEEE/CVF Conference on Computer Vision and Pattern Recognition, 2019, pp. 8748-8757.
Devaranjan et al., "Unsupervised learning of scene structure for synthetic data generation." U.S. Appl. No. 17/117,425, filed Sep. 9, 2021, 43 pages.
Dosovitskiy et al., "CARLA: An open urban driving simulator." In Conference on robot learning, PMLR, 2017, pp. 1-16.
Fang et al., "Augmented lidar simulator for autonomous driving." IEEE Robotics and Automation Letters 5, No. 2, 2020, pp. 1931-1938.
Fellendorf, "VISSIM: A microscopic simulation tool to evaluate actuated signal control including bus priority." In 64th Institute of Transportation Engineers Annual Meeting, vol. 32, Springer, 1994, pp. 1-9.
Frey et al., "Does the wake-sleep algorithm produce good density estimators?." Advances in neural information processing systems 8, 1995, 10 pages.
Gazis et al., "Nonlinear follow-the-leader models of traffic flow." Operations research 9, No. 4, 1961, pp. 545-567.
Geiger et al., "A generative model for 3d urban scene understanding from movable platforms." In CVPR 2011 IEEE, 2011, pp. 1945-1952.
Geiger et al.,"Joint 3d estimation of objects and scene layout." Advances in Neural Information Processing Systems 24, 2011.
Gerlough, "Simulation of freeway traffic on a general-purpose discrete variable computer." PhD diss., University of California, Los Angeles, 1955.
Gipps, "Computer program multsim for simulating output from vehicle detectors on a multi-lane signal-controlled road". No. Monograph. 1976.
Graves, "Generating sequences with recurrent neural networks." arXiv preprint arXiv: 1308.0850, 2013, 43 pages.
Gretton et al., "A kernel two-sample test." The Journal of Machine Learning Research 13, No. 1, 2012, pp. 723-773.
Ha et al., "A neural representation of sketch drawings." arXiv preprint arXiv: 1704.03477, 2017, 15 pages.
Heusel et al., "Gans trained by a two time-scale update rule converge to a local nash equilibrium." Advances in neural information processing systems 30, 2017, 12 pages.
Hochreiter et al., "Long short-term memory." Neural computation 9, No. 8, 1997, pp. 1735-1780.
Holtzman et al., "The curious case of neural text degeneration." arXiv preprint arXiv:1904.09751, 2019, 16 pages.
Jesenski et al., "Generation of scenes in intersections for tire validation of highly automated driving functions." In 2019 IEEE Intelligent Vehicles Symposium (IV), IEEE, 2019, pp. 502-509.
Jyothi et al., "Layoutvae: Stochastic scene layout generation from a label set." In Proceedings of the IEEE/CVF International Conference on Computer Vision, 2019, pp. 9895-9904.
Kar et al., "Meta-sim: Learning to generate synthetic datasets." In Proceedings of the IEEE/CVF International Conference on Computer Vision, 2019, pp. 4551-4560.
Kingma et al., "Adam: A method for stochastic optimization." arXiv preprint arXiv: 1412.6980, 2014, 15 pages.
Liang et al., "Learning lane graph representations for motion forecasting." In European Conference on Computer Vision, Springer, Cham, 2020, pp. 541-556.
Liao et al., "Efficient graph generation with graph recurrent attention networks." Advances in Neural Information Processing Systems 32, 2019, 11 pages.
Lighthill et al., "On kinematic waves II. A theory of traffic flow on long crowded roads." Proceedings of the Royal Society of London. Series A. Mathematical and Physical Sciences 229, No. 1178, 1955, pp. 317-345.
Lopez et al., "Microscopic traffic simulation using sumo." In 2018 21st international conference on intelligent transportation systems (ITSC), IEEE, 2018, pp. 2575-2582.
Manivasagam et al., "Lidarsim: Realistic lidar simulation by leveraging the real world." In Proceedings of the IEEE/CVF Conference on Computer Vision and Pattern Recognition, 2020, pp. 11167-11176.
Nash et al., "Polygen: An autoregressive generative model of 3d meshes." In International Conference on Machine Learning, PMLR, 2020, pp. 7220-7229.
Newell, "Nonlinear effects in the dynamics of car following." Operations research 9, No. 2, 1961, pp. 209-229.
Oord et al., "Wavenet: A generative model for raw audio." arXiv preprint arXiv: 1609.03499, 2016, 15 pages.
Oord et al., "Pixel recurrent neural networks." In International conference on machine learning, PMLR, 2016, pp. 1747-1756.
Owen et al., "Traffic flow simulation using CORSIM." In 2000 Winter Simulation Conference Proceedings (Cat. No. OOCH37165), vol. 2, IEEE, 2000, pp. 1143-1147.
Pipes, "An operational analysis of traffic dynamics." Journal of applied physics 24, No. 3, 1953, pp. 274-281.
Prakash et al., "Structured domain randomization: Bridging the reality gap by context-aware synthetic data." In 2019 International Conference on Robotics and Automation (ICRA), IEEE, 2019, pp. 7249-7255.
Prokudin et al., "Deep directional statistics: Pose estimation with uncertainty quantification." In Proceedings of the European conference on computer vision (ECCV), 2018, pp. 534-551.
Radford et al., "Language models are unsupervised multitask learners." OpenAI blog 1, No. 8, 2019, pp. 9.
Richards, "Shock waves on the highway." Operations research 4, No. 1, 1956, pp. 42-51.
Salimans et al., "Improved techniques for training gans." Advances in neural information processing systems 29, 2016, 9 pages.
Shi et al., "Convolutional LSTM network: A machine learning approach for precipitation nowcasting." Advances in neural information processing systems 28, 2015, 9 pages.
Taheri, "An investigation and design of slip control braking systems integrated with four-wheel steering." PhD diss., Clemson University, 1990, pages.
Treiber et al., "Congested traffic states in empirical observations and microscopic simulations." Physical review E 62, No. 2, 2000, pp. 1805.
Uria et al., "A deep and tractable density estimator." In International Conference on Machine Learning, PMLR, 2014, pp. 467-475.
Uria et al., "RNADE: The real-valued neural autoregressive density-estimator." Advances in Neural Information Processing Systems 26, 2013, 9 pages.
Wang et al., "Deep convolutional priors for indoor scene synthesis." ACM Transactions on Graphics (TOG) 37, No. 4, 2018, pp. 1-14.
Wheeler et al., "Factor graph scene distributions for automotive safety analysis." In 2016 IEEE 19th International Conference on Intelligent Transportation Systems (ITSC), IEEE, 2016, pp. 1035-1040.
Wheeler et al., "Initial scene configurations for highway traffic propagation." In 2015 IEEE 18th International Conference on Intelligent Transportation Systems, IEEE, 2015, pp. 279-284.

(56) References Cited

OTHER PUBLICATIONS

Wong et al., "Testing the safety of self-driving vehicles by simulating perception and prediction." In European Conference on Computer Vision, Springer, Cham, 2020, pp. 312-329.

Yang et al., "A microscopic traffic simulator for evaluation of dynamic traffic management systems." Transportation Research Part C: Emerging Technologies 4, No. 3, 1996, pp. 113-129.

Yang et al., "Hdnet: Exploiting hd maps for 3d object detection." In Conference on Robot Learning, PMLR, 2018, pp. 146-155.

You et al., "Graphrnn: Generating realistic graphs with deep auto-regressive models." In International conference on machine learning, PMLR, 2018, pp. 5708-5717.

Zhang et al., "Understanding high-level semantics by modeling traffic patterns." In Proceedings of the IEEE international conference on computer vision, 2013, pp. 3056-3063.

* cited by examiner

SYSTEMS AND METHODS FOR SIMULATING TRAFFIC SCENES

RELATED APPLICATION

The present application is based on and claims the benefit of U.S. Provisional Patent Application No. 63/114,848, filed Nov. 17, 2020, which is hereby incorporated by reference herein in its entirety.

BACKGROUND

An autonomous platform can process data to perceive an environment through which the platform can travel. For example, an autonomous vehicle can perceive its environment using a variety of sensors and identify objects around the autonomous vehicle. The autonomous vehicle can identify an appropriate path through the perceived surrounding environment and navigate along the path with minimal or no human input.

SUMMARY

Aspects and advantages of embodiments of the present disclosure are set forth in the following description. The present disclosure is directed to improved techniques for generating realistic simulated environmental scenes (e.g., simulated traffic scenes in a travel way environment). For instance, some implementations of environmental scene generators according to the present disclosure provide for more complex and diverse collections of simulated environmental scenes by sampling simulated scenes from probabilistic distributions of scenes.

In some implementations, the environment can include a travel way, and the scene of interest can be a traffic scene. The traffic scene can be a snapshot (e.g., at a moment in time). Some example traffic scene generators of the present disclosure automatically select and insert objects into a traffic scene by sampling object characteristics from corresponding probabilistic distributions. For example, a traffic scene generator can be provided state information about a subject vehicle (e.g., a self-driving vehicle) and a high-definition map of an environment around the vehicle and generate actors or other objects of various classes for insertion into the scene. For instance, in some implementations, the traffic scene generator automatically obtains a size, orientation, velocity, and/or other parameter(s) of each object that is inserted into the scene by sampling the parameters from probabilistic distributions. In some implementations, multiple characteristics of an object are each respectively obtained from multiple machine-learned distributions (e.g., sampled from a probabilistic distribution of a respective parameter). In some implementations, some distributions for an object are generated in view of one or more other previously-sampled parameters for that object.

In some implementations, traffic scene generators of the present disclosure generate joint probability distributions for objects in a traffic scene. In some implementations, a joint probability distribution for the traffic scene (e.g., for multiple objects in the scene) can be decomposed (e.g., autoregressively) into a product of probabilities for the objects in the scene. For example, in some implementations, multiple objects are obtained sequentially, with parameters of later-inserted objects being sampled from their respective distributions in view of (e.g., conditioned on) objects previously inserted into the scene. In this manner, a joint probability distribution may be sampled to obtain a simulated traffic scene.

The joint probability distributions can also be used, for example, to determine the probability of an input traffic scene (e.g., existing reference scenes, such as pre-recorded scenes). In this manner, for instance, example implementations of a traffic scene generator are trained by optimizing (e.g., maximizing) a determined probability of real-world traffic scenes.

Example systems and methods according to aspects of the present disclosure provide various technical effects and benefits. Realistic simulated environmental scenes can be used, for example, as substitutes for recordings of real environmental scenes. For example, snapshots containing simulated scenes can be used to initialize other simulations (e.g., traffic simulations, such as simulations over time, etc.). Snapshots containing simulated scenes can also be used to obtain labeled training data for machine-learned systems that interface with the scene (e.g., perception systems, etc.). Simulated environmental data can be generated much faster and more inexpensively than obtaining equivalent amounts of real-world recorded environmental data. For example, obtaining real-world recorded traffic scene data can require traveling along roadways and recording traffic events no faster than in real time, while generating simulated traffic scene data can be accomplished virtually, without wear and tear on physical vehicles (and the emissions thereof), and without any speed restriction of real-time synthesis.

A broad spectrum of diverse simulated traffic scenes can be generated quicker than the time necessary to obtain the same amount of real-world data, enabling a larger quantity of training data to be obtained in a shorter time frame. And generating simulated traffic scenes with greater complexity and diversity using example traffic scene generators according to the present disclosure can provide for improved training data to train more robust machine-learned models in less time and with less expense.

Improved quality of a collection of simulated traffic scenes (e.g., improved complexity and/or diversity) can provide better correlation to real-world traffic scenes, and thus increase the simulation's value as a substitute (e.g., for training machine-learned models). For example, a simulated traffic scene can be used for training an autonomous vehicle to better perceive and understand its environment (e.g., in traffic), instead or in addition to training with recordings of real traffic scenes. For instance, a simulated traffic scene generated according to aspects of the present disclosure can be subsequently processed to obtain simulated sensor data. In this manner, for instance, perception functions of an autonomous vehicle can be improved by training one or more perception models using simulated sensor data as training data. For example, simulated sensor data generated from the simulated environment can be labeled with the simulated "ground truth" scene data, and one or more perception models can be trained to infer the "ground truth" from the simulated sensor data. Accordingly, improving the realism (e.g., including diversity and complexity) of simulated traffic scenes can improve the capability of machine-learned perception systems.

In another aspect, improving the quality of simulated data can decrease an amount of real-world data used to supplement or verify the simulated data, thereby decreasing the time and expense for training machine-learned models to robustly process real-world data (e.g., long tail data, such as data outside a training set, etc.). In this manner, for example, the simulated environmental scenes of the present disclosure can provide an improvement to testing techniques for autonomous platforms (e.g., autonomous vehicles), machine-learning algorithms, vision systems, etc. by providing for improved generation of and access to realistically complex and diverse scenes. Ultimately, the techniques disclosed herein result in more accurate, robust, and diverse simulation data, thereby improving training techniques for a vast array of robotic, vision, or autonomous vehicle technologies.

Example systems and methods according to aspects of the present disclosure offer various improvements over prior approaches. Existing methods for simulating traffic scenes typically insert actors into the scene according to a set of hand-crafted heuristics and have limited ability to model the true complexity and diversity of real traffic scenes. The hand-crafted nature of these prior methods can create a content gap between simulated and real traffic scenes that inhibits the training and development of machine-learned models that are robust to complex and varied real-world situations. As a result, some existing simulators generally lack the fidelity necessary to train and test self-driving vehicles.

In contrast, some example implementations of the present disclosure leverage a machine-learned traffic scene generation model that eschews the need for hand-crafted rules and heuristics by sampling simulated traffic scenes from probabilistic distributions of traffic scene configurations. The machine-learned distributions, in some examples, are learned from real-world distributions of traffic scenes, so that simulated scenes sampled from the distributions can display more realistic complexity and diversity.

For example, in an aspect, the present disclosure provides an example computer-implemented method for traffic scene generation. The example method includes (a) obtaining environmental data descriptive of an environment, a subject vehicle within the environment, and an object set within the environment. The example method includes (b) sampling a plurality of parameters of a new object. In the example method, the plurality of parameters are sampled respectively from a plurality of probability distributions. In the example method, the plurality of probability distributions are sequentially generated by a machine-learned traffic scene generation model and based at least in part on the environmental data. In the example method, at least one of the plurality of probability distributions is conditioned upon one or more of the plurality of probability distributions that were previously sequentially generated. The example method includes (c) updating the environmental data by adding the new object to the object set. The example method includes (d) outputting the environmental data descriptive of a synthesized traffic scene.

In some implementations of the example method, the example method includes iteratively performing (b) and (c) for a plurality of iterations to obtain a plurality of new objects. In some implementations of the example method, each of the plurality of new objects is obtained based at least in part on environmental data updated by a prior iteration.

In some implementations of the example method, for a final iteration of the plurality of iterations, the plurality of parameters include an end token that, when sampled, results in termination of the plurality of iterations.

In some implementations of the example method, the machine-learned traffic scene generation model is configured to determine a joint probability distribution of the synthesized traffic scene over the object set conditioned on the subject vehicle. In some implementations of the example method, the joint probability distribution is autoregressively factorized and includes the plurality of probability distributions. In some implementations of the example method, the machine-learned traffic scene generation model has been trained by optimizing a likelihood of real-world traffic scenes contained in a training dataset.

In some implementations of the example method, the machine-learned traffic scene generation model includes a shared backbone feature extraction portion that extracts features from the environmental data and a plurality of prediction models that respectively generate the plurality of probability distributions based at least in part on the features. In some implementations of the example method, the machine-learned traffic scene generation model includes an autoregressive model including a convolutional long short-term memory neural network.

In some implementations of the example method, the environmental data includes a collection of polygons and polylines that provide semantic priors for a region of interest around the subject vehicle. In some implementations of the example method, the environmental data includes a multi-channel image encoding of a top-down view of the environment. In some implementations of the example method, the plurality of parameters include one or more of: an object class, an object position, an object bounding box, or an object velocity.

In some implementations of the example method, the example method includes (e) generating simulated sensor data for the environment based on the environmental data output at (d). In some implementations of the example method, the example method includes (f) obtaining labels for the simulated sensor data that correspond to the plurality of parameter values. In some implementations of the example method, the example method includes (g) training one or more machine-learned models of an autonomous vehicle control system using the labels and the simulated sensor data.

For example, in an aspect, the present disclosure provides an example computing system for traffic scene generation. The example system includes one or more processors and one or more non-transitory computer-readable media that collectively store instructions. In the example system, the instructions, when executed by the one or more processors, cause the example system to perform operations. In the example system, the operations include (a) obtaining environmental data descriptive of an environment, a subject vehicle within the environment, and an object set within the environment. In the example system, the operations include (b) for one or more iterations, sampling a plurality of parameters of a new object. In the operations of the example system, the plurality of parameters are sampled respectively from a plurality of probability distributions. In the operations of the example system, the plurality of probability distributions are sequentially generated by a machine-learned traffic scene generation model and based at least in part on the environmental data. In the operations of the example system, at least one of the plurality of probability distributions is conditioned upon one or more of the plurality of probability distributions that were previously sequentially generated. In the example system, the operations include (c) for each of the one or more iterations, updating the environmental data by adding the new object to the object set. In the example system, the operations include (d) after the one or more iterations, providing, as an output, the environmental data descriptive of a synthesized traffic scene.

In some implementations of the example system, the machine-learned traffic scene generation model is configured to determine a joint probability distribution of the synthesized traffic scene over the object set conditioned on the subject vehicle.

In some implementations of the example system, for a final iteration of the one or more iterations, the plurality of parameters include an end token that, when sampled, results in termination of the one or more iterations.

In some implementations of the example system, the machine-learned traffic scene generation model includes a shared backbone feature extraction portion that extracts features from the environmental data and a plurality of prediction models that respectively generate the plurality of probability distributions based at least in part on the features.

In some implementations of the example system, the operations include (e) generating simulated sensor data for the environment based on the environmental data output at (d). In some implementations of the example system, the operations include (f) obtaining labels for the simulated sensor data that correspond to the plurality of parameters. In some implementations of the example system, the operations include (g) training one or more machine-learned models of an autonomous vehicle control system using the labels and the simulated sensor data.

For example, in an aspect, the present disclosure provides an example autonomous vehicle control system. The example autonomous vehicle control system includes one or more machine-learned models that have been trained using simulated sensor data representing at least a portion of a synthesized traffic scene, the simulated sensor data having been generated by performance of example operations. The example operations include (a) obtaining environmental data descriptive of an environment, a subject vehicle within the environment, and an object set within the environment. The example operations include (b) for one or more iterations, sampling a plurality of parameters of a new object. In the example operations, the plurality of parameters are sampled respectively from a plurality of probability distributions sequentially generated by a machine-learned traffic scene generation model and based at least in part on the environmental data. In the example operations, at least one of the plurality of probability distributions is conditioned upon one or more of the plurality of probability distributions that were previously sequentially generated. The example operations include (c) for each of the one or more iterations, updating the environmental data by adding the new object to the object set. The example operations include (d) generating the simulated sensor data based on the environmental data updated at (c).

In some implementations of the example autonomous vehicle control system, the machine-learned traffic scene generation model is configured to determine a joint probability distribution of the synthesized traffic scene over the object set conditioned on the subject vehicle.

In some implementations of the example autonomous vehicle control system, the machine-learned traffic scene generation model includes a shared backbone feature extraction portion that extracts features from the environmental data a plurality of prediction models that respectively generate the plurality of probability distributions based at least in part on the features. In some implementations of the example autonomous vehicle control system, the plurality of probability distributions autoregressively factorize the joint probability distribution.

Other example aspects of the present disclosure are directed to other systems, methods, vehicles, apparatuses, tangible non-transitory computer-readable media, and devices for generating trajectories, training models, and performing other functions described herein. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

The following describes the technology of this disclosure within the context of an autonomous vehicle for example purposes only. As described herein, the technology described herein is not limited to an autonomous vehicle and can be implemented within other autonomous platforms and other computing systems.

Figure 1:
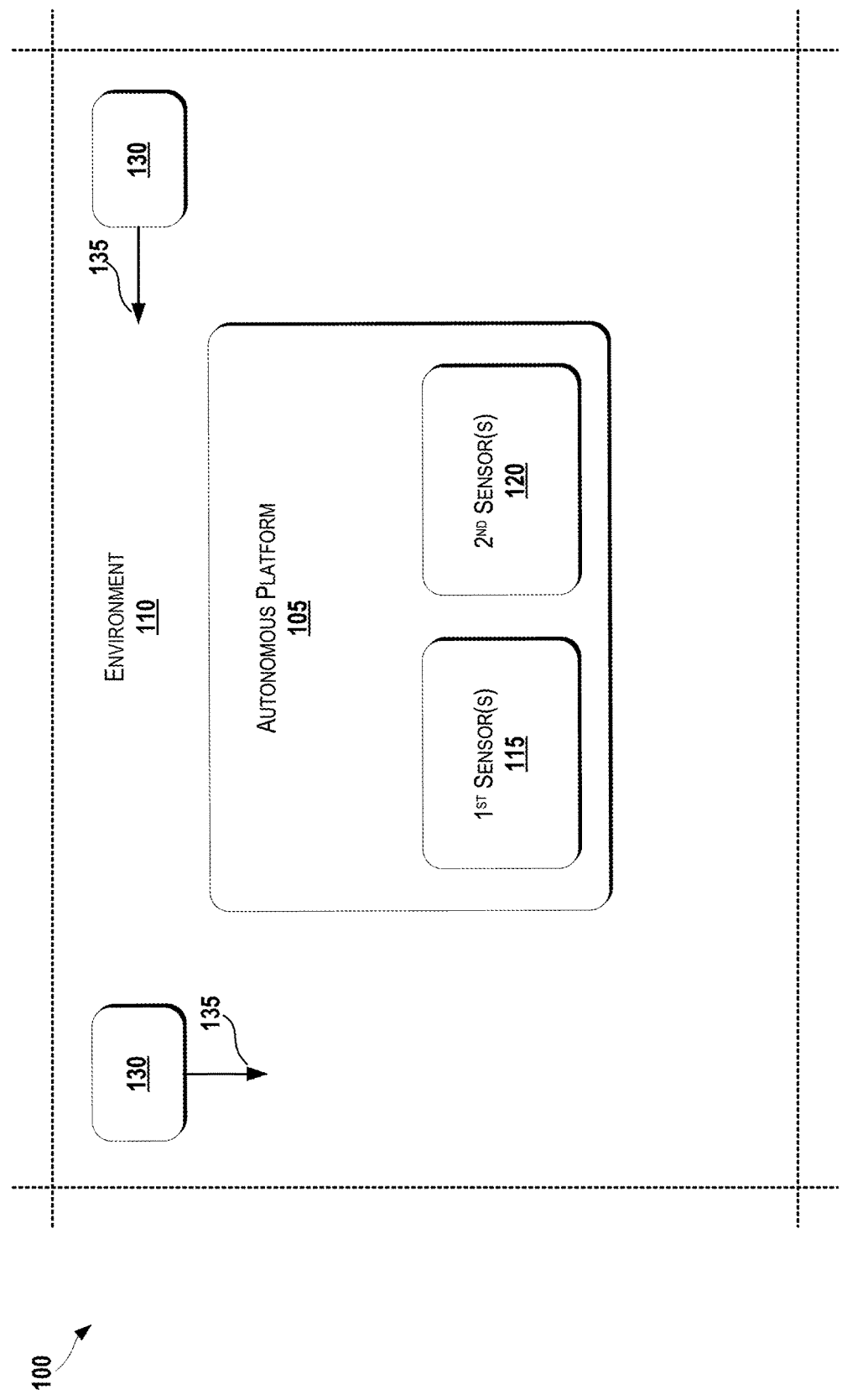
FIG. 1 is a block diagram of an operational scenario, according to some implementations of the present disclosure.

With reference now to FIGS. 1-11, example embodiments of the present disclosure will be discussed in further detail. FIG. 1 depicts a block diagram of an example operational scenario 100 according to example implementations of the present disclosure. The operational scenario 100 includes an autonomous platform 105 and an environment 110. The environment 110 can be external to the autonomous platform 105. The autonomous platform 105, for example, can operate within the environment 110. The environment 110 can include an indoor environment (e.g., within one or more facilities, etc.) or an outdoor environment. An outdoor environment, for example, can include one or more areas in the outside world such as, for example, one or more rural areas (e.g., with one or more rural travel ways, etc.), one or more urban areas (e.g., with one or more city travel ways, highways, etc.), one or more suburban areas (e.g., with one or more suburban travel ways, etc.), etc. An indoor environment, for example, can include environments enclosed by a structure such as a building (e.g., a service depot, manufacturing facility, etc.).

The environment 110 can include one or more dynamic object(s) 130 (e.g., simulated objects, real-world objects, etc.). The dynamic object(s) 130 can include any number of moveable objects such as, for example, one or more pedestrians, animals, vehicles, etc. The dynamic object(s) 130 can move within the environment according to one or more trajectories 135. Although trajectories 135 are depicted as emanating from dynamic object(s) 130, it is also to be understood that relative motion within the environment 110 can include one or more trajectories of the autonomous platform 105 itself.

The autonomous platform 105 can include one or more sensor(s) 115, 120. The one or more sensors 115, 120 can be configured to generate or store data descriptive of the environment 110 (e.g., one or more static or dynamic objects therein, etc.). The sensor(s) 115, 120 can include one or more LIDAR systems, one or more Radio Detection and Ranging (RADAR) systems, one or more cameras (e.g., visible spectrum cameras or infrared cameras, etc.), one or more sonar systems, one or more motion sensors, or other types of image capture devices or sensors. The sensor(s) 115, 120 can include multiple sensors of different types. For instance, the sensor(s) 115, 120 can include one or more first sensor(s) 115 and one or more second sensor(s) 120. The first sensor(s) 115 can include a different type of sensor than the second sensor(s) 120. By way of example, the first sensor(s) 115 can include one or more imaging device(s) (e.g., cameras, etc.), whereas the second sensor(s) 120 can include one or more depth measuring device(s) (e.g., LIDAR device, etc.).

The autonomous platform 105 can include any type of platform configured to operate within the environment 110. For example, the autonomous platform 105 can include one or more different type(s) of vehicle(s) configured to perceive and operate within the environment 110. The vehicles, for example, can include one or more autonomous vehicle(s) such as, for example, one or more autonomous trucks. By way of example, the autonomous platform 105 can include an autonomous truck, including an autonomous tractor coupled to a cargo trailer. In addition, or alternatively, the autonomous platform 105 can include any other type of vehicle such as one or more aerial vehicles, ground-based vehicles, water-based vehicles, space-based vehicles, etc.

Figure 2:
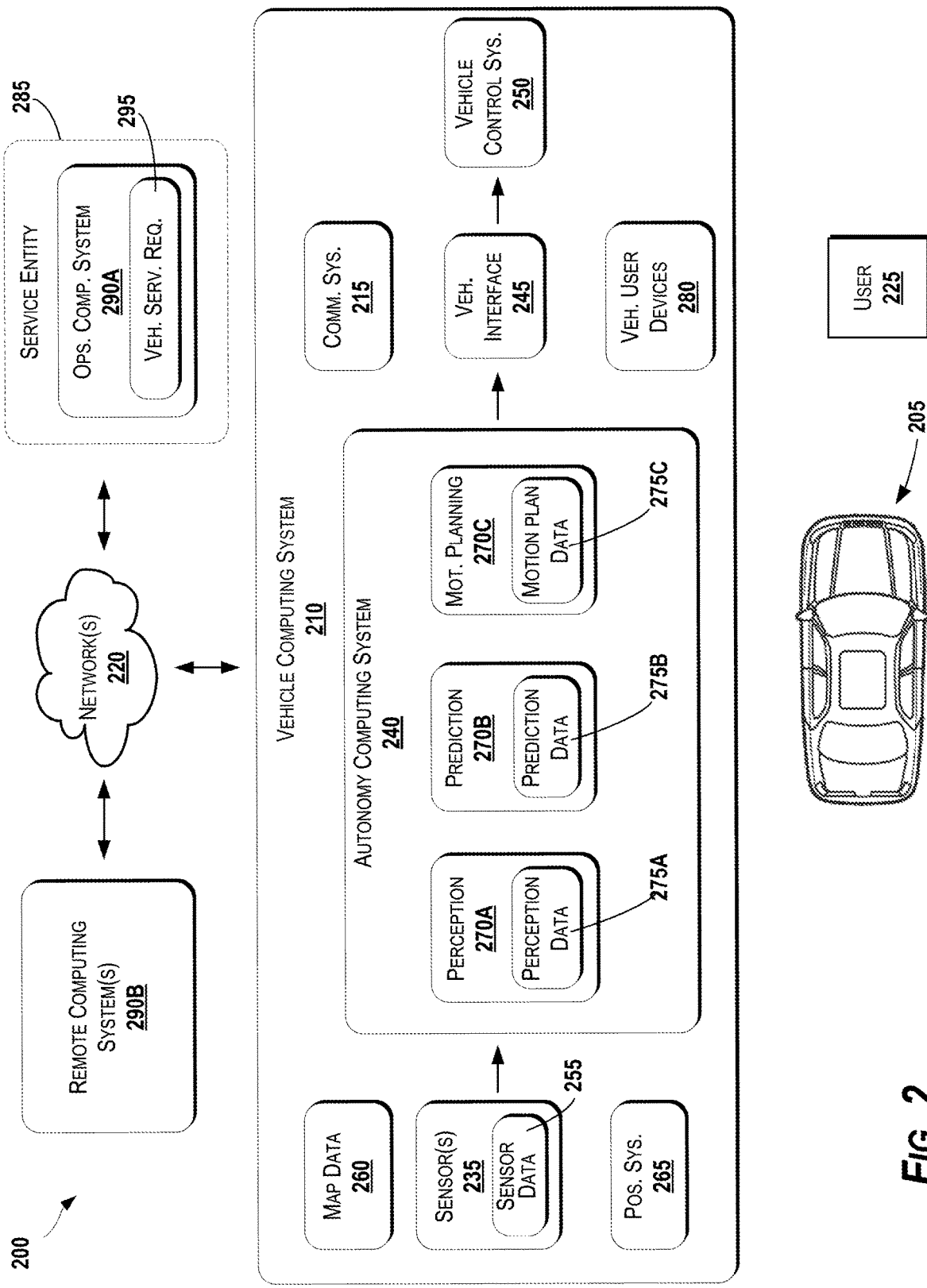
FIG. 2 is a block diagram of a system, according to some implementations of the present disclosure.

FIG. 2 depicts an example system overview 200 of the autonomous platform as an autonomous vehicle according to example implementations of the present disclosure. More particularly, FIG. 2 illustrates a vehicle 205 including various systems and devices configured to control the operation of the vehicle 205. For example, the vehicle 205 can include an onboard vehicle computing system 210 (e.g., located on or within the autonomous vehicle, etc.) that is configured to operate the vehicle 205. For example, the vehicle computing system 210 can represent or be an autonomous vehicle control system configured to perform the operations and functions described herein for the simulation of traffic scenes, for the training of models for the simulation of traffic scenes, or for the training of the autonomous vehicle control system based at least in part on simulated traffic scenes.

Generally, the vehicle computing system 210 can obtain sensor data 255 from sensor(s) 235 (e.g., sensor(s) 115, 120 of FIG. 1, etc.) onboard the vehicle 205, attempt to comprehend the vehicle's surrounding environment by performing various processing techniques on the sensor data 255, and generate an appropriate motion plan through the vehicle's surrounding environment (e.g., environment 110 of FIG. 1, etc.).

The vehicle 205 incorporating the vehicle computing system 210 can be various types of vehicles. For instance, the vehicle 205 can be an autonomous vehicle. The vehicle 205 can be a ground-based autonomous vehicle (e.g., car, truck, bus, etc.). The vehicle 205 can be an air-based autonomous vehicle (e.g., airplane, helicopter, etc.). The vehicle 205 can be a lightweight electric vehicle (e.g., bicycle, scooter, etc.). The vehicle 205 can be another type of vehicle (e.g., watercraft, etc.). The vehicle 205 can drive, navigate, operate, etc. with minimal or no interaction from a human operator (e.g., driver, pilot, etc.). In some implementations, a human operator can be omitted from the vehicle 205 (or also omitted from remote control of the vehicle 205). In some implementations, a human operator can be included in the vehicle 205.

The vehicle 205 can be configured to operate in a plurality of operating modes. The vehicle 205 can be configured to operate in a fully autonomous (e.g., self-driving, etc.) operating mode in which the vehicle 205 is controllable without user input (e.g., can drive and navigate with no input from a human operator present in the vehicle 205 or remote from the vehicle 205, etc.). The vehicle 205 can operate in a semi-autonomous operating mode in which the vehicle 205 can operate with some input from a human operator present in the vehicle 205 (or a human operator that is remote from the vehicle 205). The vehicle 205 can enter into a manual operating mode in which the vehicle 205 is fully controllable by a human operator (e.g., human driver, pilot, etc.) and can be prohibited or disabled (e.g., temporary, permanently, etc.) from performing autonomous navigation (e.g., autonomous driving, flying, etc.). The vehicle 205 can be configured to operate in other modes such as, for example, park or sleep modes (e.g., for use between tasks/actions such as waiting to provide a vehicle service, recharging, etc.). In some implementations, the vehicle 205 can implement vehicle operating assistance technology (e.g., collision mitigation system, power assist steering, etc.), for example, to help assist the human operator of the vehicle 205 (e.g., while in a manual mode, etc.).

To help maintain and switch between operating modes, the vehicle computing system 210 can store data indicative of the operating modes of the vehicle 205 in a memory onboard the vehicle 205. For example, the operating modes can be defined by an operating mode data structure (e.g., rule, list, table, etc.) that indicates one or more operating parameters for the vehicle 205, while in the particular operating mode. For example, an operating mode data structure can indicate that the vehicle 205 is to autonomously plan its motion when in the fully autonomous operating mode. The vehicle computing system 210 can access the memory when implementing an operating mode.

The operating mode of the vehicle 205 can be adjusted in a variety of manners. For example, the operating mode of the vehicle 205 can be selected remotely, off-board the vehicle 205. For example, a remote computing system (e.g., of a vehicle provider, fleet manager, or service entity associated with the vehicle 205, etc.) can communicate data to the vehicle 205 instructing the vehicle 205 to enter into, exit from, maintain, etc. an operating mode. By way of example, such data can instruct the vehicle 205 to enter into the fully autonomous operating mode.

In some implementations, the operating mode of the vehicle 205 can be set onboard or near the vehicle 205. For example, the vehicle computing system 210 can automatically determine when and where the vehicle 205 is to enter, change, maintain, etc. a particular operating mode (e.g., without user input, etc.). Additionally, or alternatively, the operating mode of the vehicle 205 can be manually selected through one or more interfaces located onboard the vehicle 205 (e.g., key switch, button, etc.) or associated with a computing device within a certain distance to the vehicle 205 (e.g., a tablet operated by authorized personnel located near the vehicle 205 and connected by wire or within a wireless communication range, etc.). In some implementations, the operating mode of the vehicle 205 can be adjusted by manipulating a series of interfaces in a particular order to cause the vehicle 205 to enter into a particular operating mode.

The operations computing system 290A can include multiple components for performing various operations and functions. For example, the operations computing system 290A can be configured to monitor and communicate with the vehicle 205 or its users. This can include overseeing the vehicle 205 and/or coordinating a vehicle service provided by the vehicle 205 (e.g., cargo delivery service, passenger transport, etc.). To do so, the operations computing system 290A can communicate with the one or more remote computing system(s) 290B or the vehicle 205 through one or more communications network(s) including the communications network(s) 220. The communications network(s) 220 can send or receive signals (e.g., electronic signals, etc.) or data (e.g., data from a computing device, etc.) and include any combination of various wired (e.g., twisted pair cable, etc.) or wireless communication mechanisms (e.g., cellular, wireless, satellite, microwave, and radio frequency, etc.) or any desired network topology (or topologies). For example, the communications network 220 can include a local area network (e.g., intranet, etc.), wide area network (e.g., the Internet, etc.), wireless LAN network (e.g., through Wi-Fi, etc.), cellular network, a SATCOM network, VHF network, a HF network, a WiMAX based network, or any other suitable communications network (or combination thereof) for transmitting data to or from the vehicle 205.

Each of the one or more remote computing system(s) 290B or the operations computing system 290A can include one or more processors and one or more memory devices. The one or more memory devices can be used to store instructions that when executed by the one or more processors of the one or more remote computing system(s) 290B or operations computing system 290A cause the one or more processors to perform operations or functions including operations or functions associated with the vehicle 205 including sending or receiving data or signals to or from the vehicle 205, monitoring the state of the vehicle 205, or controlling the vehicle 205. The one or more remote computing system(s) 290B can communicate (e.g., exchange data or signals, etc.) with one or more devices including the operations computing system 290A and the vehicle 205 through the communications network(s) 220.

The one or more remote computing system(s) 290B can include one or more computing devices such as, for example, one or more devices associated with a service entity (e.g., coordinating and managing a vehicle service), one or more operator devices associated with one or more vehicle providers (e.g., providing vehicles for use by the service entity, etc.), user devices associated with one or more vehicle passengers, developer devices associated with one or more vehicle developers (e.g., a laptop/tablet computer configured to access computer software of the vehicle computing system 210, etc.), or other devices. One or more of the devices can receive input instructions from a user or exchange signals or data with an item or other computing device or computing system (e.g., the operations computing system 290A, etc.). Further, the one or more remote computing system(s) 290B can be used to determine or modify one or more states of the vehicle 205 including a location (e.g., a latitude and longitude, etc.), a velocity, an acceleration, a trajectory, a heading, or a path of the vehicle 205 based in part on signals or data exchanged with the vehicle 205. In some implementations, the operations computing system 290A can include the one or more remote computing system(s) 290B.

The vehicle computing system 210 can include one or more computing devices located onboard the autonomous vehicle 205. For example, the computing device(s) can be located on or within the autonomous vehicle 205. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 205 (e.g., its computing system, one or more processors, etc.) to perform operations and functions, such as those described herein for collecting and processing sensor data, performing autonomy functions, predicting object trajectories and generating vehicle motion trajectories, controlling the vehicle 205, communicating with other computing systems, updating machine-learned model parameters based on training (e.g., using simulated traffic scenes), etc.

The vehicle 205 can include a communications system 215 configured to allow the vehicle computing system 210 (and its computing device(s)) to communicate with other computing devices. The communications system 215 can include any suitable components for interfacing with one or more network(s) 220, including, for example, transmitters, receivers, ports, controllers, antennas, or other suitable components that can help facilitate communication. In some implementations, the communications system 215 can include a plurality of components (e.g., antennas, transmitters, or receivers, etc.) that allow it to implement and utilize multiple-input, multiple-output (MIMO) technology and communication techniques. The vehicle computing system 210 can use the communications system 215 to communicate with one or more computing devices that are remote from the vehicle 205 over the communication network(s) 220 (e.g., through one or more wireless signal connections, etc.).

As shown in FIG. 2, the vehicle computing system 210 can include the one or more sensors 235, the autonomy computing system 240, the vehicle interface 245, the one or more vehicle control systems 250, and other systems, as described herein. One or more of these systems can be configured to communicate with one another through one or more communication channels. The communication channel(s) can include one or more data buses (e.g., controller area network (CAN), etc.), on-board diagnostics connector (e.g., OBD-II, etc.), or a combination of wired or wireless communication links. The onboard systems can send or receive data, messages, signals, etc. amongst one another through the communication channel(s).

In some implementations, the sensor(s) 235 can include one or more LIDAR sensor(s). The sensor(s) 235 can be configured to generate point data descriptive of a portion of a three-hundred-and-sixty-degree view of the surrounding environment. The point data can be three-dimensional LIDAR point cloud data. In some implementations, one or more sensors 235 for capturing depth information can be fixed to a rotational device in order to rotate the sensor(s) about an axis. The sensor(s) 235 can be rotated about the axis while capturing data in interval sector packets descriptive of different portions of a three-hundred-and-sixty-degree view of a surrounding environment of the autonomous vehicle 205. In some implementations, one or more sensors 235 for capturing depth information can be solid state.

In some implementations, the sensor(s) 235 can include at least two different types of sensor(s). For instance, the sensor(s) 235 can include at least one first sensor (e.g., the first sensor(s) 115, etc.) and at least one second sensor (e.g., the second sensor(s) 120, etc.). The at least one first sensor can be a different type of sensor than the at least one second sensor. For example, the at least one first sensor can include one or more image capturing device(s) (e.g., one or more cameras, RGB cameras, etc.). In addition, or alternatively, the at least one second sensor can include one or more depth capturing device(s) (e.g., LIDAR sensor, etc.). The at least two different types of sensor(s) can obtain multi-modal sensor data indicative of one or more static or dynamic objects within an environment of the autonomous vehicle 205.

The sensor(s) 235 can be configured to acquire sensor data 255. The sensor(s) 235 can be external sensors configured to acquire external sensor data. This can include sensor data associated with the surrounding environment of the vehicle 205. The surrounding environment of the vehicle 205 can include/be represented in the field of view of the sensor(s) 235. For instance, the sensor(s) 235 can acquire image or other data of the environment outside of the vehicle 205 and within a range or field of view of one or more of the sensor(s) 235. This can include different types of sensor data acquired by the sensor(s) 235 such as, for example, data from one or more LIDAR systems, one or more RADAR systems, one or more cameras (e.g., visible spectrum cameras, infrared cameras, etc.), one or more motion sensors, one or more audio sensors (e.g., microphones, etc.), or other types of imaging capture devices or sensors. The sensor data 255 can include image data (e.g., 2D camera data, video data, etc.), RADAR data, LIDAR data (e.g., 3D point cloud data, etc.), audio data, or other types of data. The one or more sensors can be located on various parts of the vehicle 205 including a front side, rear side, left side, right side, top, or bottom of the vehicle 205. The vehicle 205 can also include other sensors configured to acquire data associated with the vehicle 205 itself. For example, the vehicle 205 can include inertial measurement unit(s), wheel odometry devices, or other sensors.

The sensor data 255 can be indicative of one or more objects within the surrounding environment of the vehicle 205. The object(s) can include, for example, vehicles, pedestrians, bicycles, or other objects. The object(s) can be located in front of, to the rear of, to the side of, above, below the vehicle 205, etc. The sensor data 255 can be indicative of locations associated with the object(s) within the surrounding environment of the vehicle 205 at one or more times. The object(s) can be static objects (e.g., not in motion, etc.) or dynamic objects, such as other objects (e.g., in motion or likely to be in motion, etc.) in the vehicle's environment, such as people, animals, machines, vehicles, etc. The sensor data 255 can also be indicative of the static background of the environment. The sensor(s) 235 can provide the sensor data 255 to the autonomy computing system 240, the remote computing device(s) 290B, or the operations computing system 290A.

In addition to the sensor data 255, the autonomy computing system 240 can obtain map data 260. The map data 260 can provide detailed information about the surrounding environment of the vehicle 205 or the geographic area in which the vehicle 205 was, is, or will be located. For example, the map data 260 can provide information regarding: the identity and location of different roadways, road segments, buildings, or other items or objects (e.g., lampposts, crosswalks or curb, etc.); the location and directions of traffic lanes (e.g., the location and direction of a parking lane, a turning lane, a bicycle lane, or other lanes within a particular roadway or other travel way or one or more boundary markings associated therewith, etc.); traffic control data (e.g., the location and instructions of signage, traffic lights, or other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicate of an ideal vehicle path such as along the center of a certain lane, etc.); or any other map data that provides information that assists the vehicle computing system 210 in processing, analyzing, and perceiving its surrounding environment and its relationship thereto. In some implementations, the map data 260 can include high-definition map data. In some implementations, the map data 260 can include sparse map data indicative of a limited number of environmental features (e.g., lane boundaries, etc.). In some implementations, the map data can be limited to geographic area(s) or operating domains in which the vehicle 205 (or autonomous vehicles generally) can travel (e.g., due to legal/regulatory constraints, autonomy capabilities, or other factors, etc.).

The vehicle 205 can include a positioning system 265. The positioning system 265 can determine a current position of the vehicle 205. This can help the vehicle 205 localize itself within its environment. The positioning system 265 can be any device or circuitry for analyzing the position of the vehicle 205. For example, the positioning system 265 can determine position by using one or more of inertial sensors (e.g., inertial measurement unit(s), etc.), a satellite positioning system, based on IP address, by using triangulation or proximity to network access points or other network components (e.g., cellular towers, WiFi access points, etc.) or other suitable techniques. The position of the vehicle 205 can be used by various systems of the vehicle computing system 210 or provided to a remote computing system. For example, the map data 260 can provide the vehicle 205 relative positions of the elements of a surrounding environment of the vehicle 205. The vehicle 205 can identify its position within the surrounding environment (e.g., across six axes, etc.) based at least in part on the map data 260. For example, the vehicle computing system 210 can process the sensor data 255 (e.g., LIDAR data, camera data, etc.) to match it to a map of the surrounding environment to get an understanding of the vehicle's position within that environment. Data indicative of the vehicle's position can be stored, communicated to, or otherwise obtained by the autonomy computing system 240.

The autonomy computing system 240 can perform various functions for autonomously operating the vehicle 205. For example, the autonomy computing system 240 can perform the following functions: perception 270A, prediction/forecasting 270B, and motion planning 270C. For example, the autonomy computing system 240 can obtain the sensor data 255 through the sensor(s) 235, process the sensor data 255 (or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction/forecasting system, a motion planning system, or other systems that cooperate to perceive the surrounding environment of the vehicle 205 and determine a motion plan for controlling the motion of the vehicle 205 accordingly. In some implementations, one or more of the perception, prediction, or motion planning functions 270A, 270B, 270C can be performed by (or combined into) the same system or through shared computing resources. In some implementations, one or more of these functions can be performed through different sub-systems. As further described herein, the autonomy computing system 240 can communicate with the one or more vehicle control systems 250 to operate the vehicle 205 according to the motion plan (e.g., through the vehicle interface 245, etc.).

The vehicle computing system 210 (e.g., the autonomy computing system 240, etc.) can identify one or more objects that are within the surrounding environment of the vehicle 205 based at least in part on the sensor data 255 or the map data 260. The objects perceived within the surrounding environment can be those within the field of view of the sensor(s) 235 or predicted to be occluded from the sensor(s) 235. This can include object(s) not in motion or not predicted to move (static objects) or object(s) in motion or predicted to be in motion (dynamic objects/actors). The vehicle computing system 210 (e.g., performing the perception function 270A, using a perception system, etc.) can process the sensor data 255, the map data 260, etc. to obtain perception data 275A. The vehicle computing system 210 can generate perception data 275A that is indicative of one or more states (e.g., current or past state(s), etc.) of one or more objects that are within a surrounding environment of the vehicle 205. For example, the perception data 275A for each object can describe (e.g., for a given time, time period, etc.) an estimate of the object's: current or past location (also referred to as position); current or past speed/velocity; current or past acceleration; current or past heading; current or past orientation; size/footprint (e.g., as represented by a bounding shape, object highlighting, etc.); class (e.g., pedestrian class vs. vehicle class vs. bicycle class, etc.), the uncertainties associated therewith, or other state information. The vehicle computing system 210 can utilize one or more algorithms or machine-learned model(s) that are configured to identify object(s) based at least in part on the sensor data 255. This can include, for example, one or more neural networks trained to identify object(s) within the surrounding environment of the vehicle 205 and the state data associated therewith. The perception data 275A can be utilized for the prediction function 270B of the autonomy computing system 240.

The vehicle computing system 210 can be configured to predict a motion of the object(s) within the surrounding environment of the vehicle 205. For instance, the vehicle computing system 210 can generate prediction data 275B associated with such object(s). The prediction data 275B can be indicative of one or more predicted future locations of each respective object. For example, the prediction function 270B can determine a predicted motion trajectory along which a respective object is predicted to travel over time. A predicted motion trajectory can be indicative of a path that the object is predicted to traverse and an associated timing with which the object is predicted to travel along the path. The predicted path can include or be made up of a plurality of waypoints. In some implementations, the prediction data 275B can be indicative of the speed or acceleration at which the respective object is predicted to travel along its associated predicted motion trajectory. The vehicle computing system 210 can utilize one or more algorithms and one or more machine-learned model(s) that are configured to predict the future motion of object(s) based at least in part on the sensor data 255, the perception data 275A, map data 260, or other data. This can include, for example, one or more neural networks trained to predict the motion of the object(s) within the surrounding environment of the vehicle 205 based at least in part on the past or current state(s) of those objects as well as the environment in which the objects are located (e.g., the lane boundary in which it is travelling, etc.). The prediction data 275B can be utilized for the motion planning function 270C of the autonomy computing system 240.

The vehicle computing system 210 can determine a motion plan for the vehicle 205 based at least in part on the perception data 275A, the prediction data 275B, or other data. For example, the vehicle computing system 210 can generate motion planning data 275C indicative of a motion plan. The motion plan can include vehicle actions (e.g., speed(s), acceleration(s), other actions, etc.) with respect to one or more of the objects within the surrounding environment of the vehicle 205 as well as the objects' predicted movements. The motion plan can include one or more vehicle motion trajectories that indicate a path for the vehicle 205 to follow. A vehicle motion trajectory can be of a certain length or time range. A vehicle motion trajectory can be defined by one or more waypoints (with associated coordinates). The waypoint(s) can be future location(s) for the vehicle 205. The planned vehicle motion trajectories can indicate the path the vehicle 205 is to follow as it traverses a route from one location to another. Thus, the vehicle computing system 210 can take into account a route/route data when performing the motion planning function 270C.

The vehicle computing system 210 can implement an optimization algorithm, machine-learned model, etc. that considers cost data associated with a vehicle action as well as other objectives (e.g., cost functions, such as cost functions based at least in part on dynamic objects, speed limits, traffic lights, etc.), if any, to determine optimized variables that make up the motion plan. The vehicle computing system 210 can determine that the vehicle 205 can perform a certain action (e.g., pass an object, etc.) without increasing the potential risk to the vehicle 205 or violating any traffic laws (e.g., speed limits, lane boundaries, signage, etc.). For instance, the vehicle computing system 210 can evaluate the predicted motion trajectories of one or more objects during its cost data analysis to help determine an optimized vehicle trajectory through the surrounding environment. The motion planning function 270C can generate cost data associated with such trajectories. In some implementations, one or more of the predicted motion trajectories or perceived objects may not ultimately change the motion of the vehicle 205 (e.g., due to an overriding factor, etc.). In some implementations, the motion plan can define the vehicle's motion such that the vehicle 205 avoids the object(s), reduces speed to give more leeway to one or more of the object(s), proceeds cautiously, performs a stopping action, passes an object, queues behind/in front of an object, etc.

The vehicle computing system 210 can be configured to continuously update the vehicle's motion plan and corresponding planned vehicle motion trajectories. For example, in some implementations, the vehicle computing system 210 can generate new motion planning data 275C (e.g., motion plan(s)) for the vehicle 205 (e.g., multiple times per second, etc.). Each new motion plan can describe a motion of the vehicle 205 over the next planning period (e.g., waypoint(s)/locations(s) over the next several seconds, etc.). Moreover, a motion plan can include a planned vehicle motion trajectory. The motion trajectory can be indicative of the future planned location(s), waypoint(s), heading, velocity, acceleration, etc. In some implementations, the vehicle computing system 210 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 205.

The vehicle computing system 210 can cause the vehicle 205 to initiate a motion control in accordance with at least a portion of the motion planning data 275C. A motion control can be an operation, action, etc. that is associated with controlling the motion of the vehicle 205. For instance, the motion planning data 275C can be provided to the vehicle control system(s) 250 of the vehicle 205. The vehicle control system(s) 250 can be associated with a vehicle interface 245 that is configured to implement a motion plan. The vehicle interface 245 can serve as an interface/conduit between the autonomy computing system 240 and the vehicle control systems 250 of the vehicle 205 and any electrical/mechanical controllers associated therewith. The vehicle interface 245 can, for example, translate a motion plan into instructions for the appropriate vehicle control component (e.g., acceleration control, brake control, steering control, etc.). By way of example, the vehicle interface 245 can translate a determined motion plan into instructions to adjust the steering of the vehicle 205 by a certain number of degrees, apply a certain magnitude of braking force, increase/decrease speed, etc. The vehicle interface 245 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 205 to autonomously travel within the vehicle's surrounding environment.

The vehicle computing system 210 can store other types of data. For example, an indication, record, or other data indicative of the state of the vehicle (e.g., its location, motion trajectory, health information, etc.), the state of one or more users (e.g., passengers, operators, etc.) of the vehicle, or the state of an environment including one or more objects (e.g., the physical dimensions or appearance of the one or more objects, locations, predicted motion, etc.) can be stored locally in one or more memory devices of the vehicle 205. Additionally, the vehicle 205 can communicate data indicative of the state of the vehicle, the state of one or more passengers of the vehicle, or the state of an environment to a computing system that is remote from the vehicle 205, which can store such information in one or more memories remote from the vehicle 205. Moreover, the vehicle 205 can provide any of the data created or store onboard the vehicle 205 to another vehicle.

The vehicle computing system 210 can include or otherwise be in communication with the one or more vehicle user devices 280. For example, the vehicle computing system 210 can include, or otherwise be in communication with, one or more user devices with one or more display devices located onboard the vehicle 205. A display device (e.g., screen of a tablet, laptop, smartphone, etc.) can be viewable by a user of the vehicle 205 that is located in the front of the vehicle 205 (e.g., driver's seat, front passenger seat, etc.). Additionally, or alternatively, a display device can be viewable by a user of the vehicle 205 that is located in the rear of the vehicle 205 (e.g., a back passenger seat, etc.). The user device(s) associated with the display devices can be any type of user device such as, for example, a tablet, mobile phone, laptop, etc. The vehicle user device(s) 280 can be configured to function as human-machine interfaces. For example, the vehicle user device(s) 280 can be configured to obtain user input, which can then be utilized by the vehicle computing system 210 or another computing system (e.g., a remote computing system, etc.). For example, a user (e.g., a passenger for transportation service, a vehicle operator, etc.) of the vehicle 205 can provide user input to adjust a destination location of the vehicle 205. The vehicle computing system 210 or another computing system can update the destination location of the vehicle 205 and the route associated therewith to reflect the change indicated by the user input.

As described herein, with reference to the remaining figures, the autonomy computing system 240 can utilize one or more machine-learned models to perform the perception 270A, prediction 270B, or motion planning 270C functions. The machine-learned model(s) can be previously trained through one or more machine-learned techniques. The machine-learned models can be previously trained by the one or more remote computing system(s) 290B, the operations computing system 290A, or any other device (e.g., remote servers, training computing systems, etc.) remote from or onboard the vehicle 205. For example, the one or more machine-learned models can be learned by a training computing system over training data stored in a training database. The training data can include, for example, sequential sensor data indicative of an environment (and objects/features within) at different time steps. In some implementations, the training data can include a plurality of environments previously recorded by the autonomous vehicle with one or more objects, static object(s) or dynamic object(s). For example, the training data can include simulated training data, such as training data based on traffic scenes simulated according to example aspects of the present disclosure.

To help improve the performance of an autonomous platform, such as an autonomous vehicle of FIG. 2, the technology of the present disclosure generally provides for the generation of simulated environmental scene data. Environmental scene data can include any data descriptive of an environment and actors and other objects within the environment. An environment can include, for example, an environment 110 containing an autonomous platform 105 and object(s) 130. Data descriptive of an environment can include past and/or present state data for the environment and any objects in the environment, any measurements of the environment and/or its contents (e.g., sensor data 255, map data 260, perception data 275A, etc.).

Figure 3:
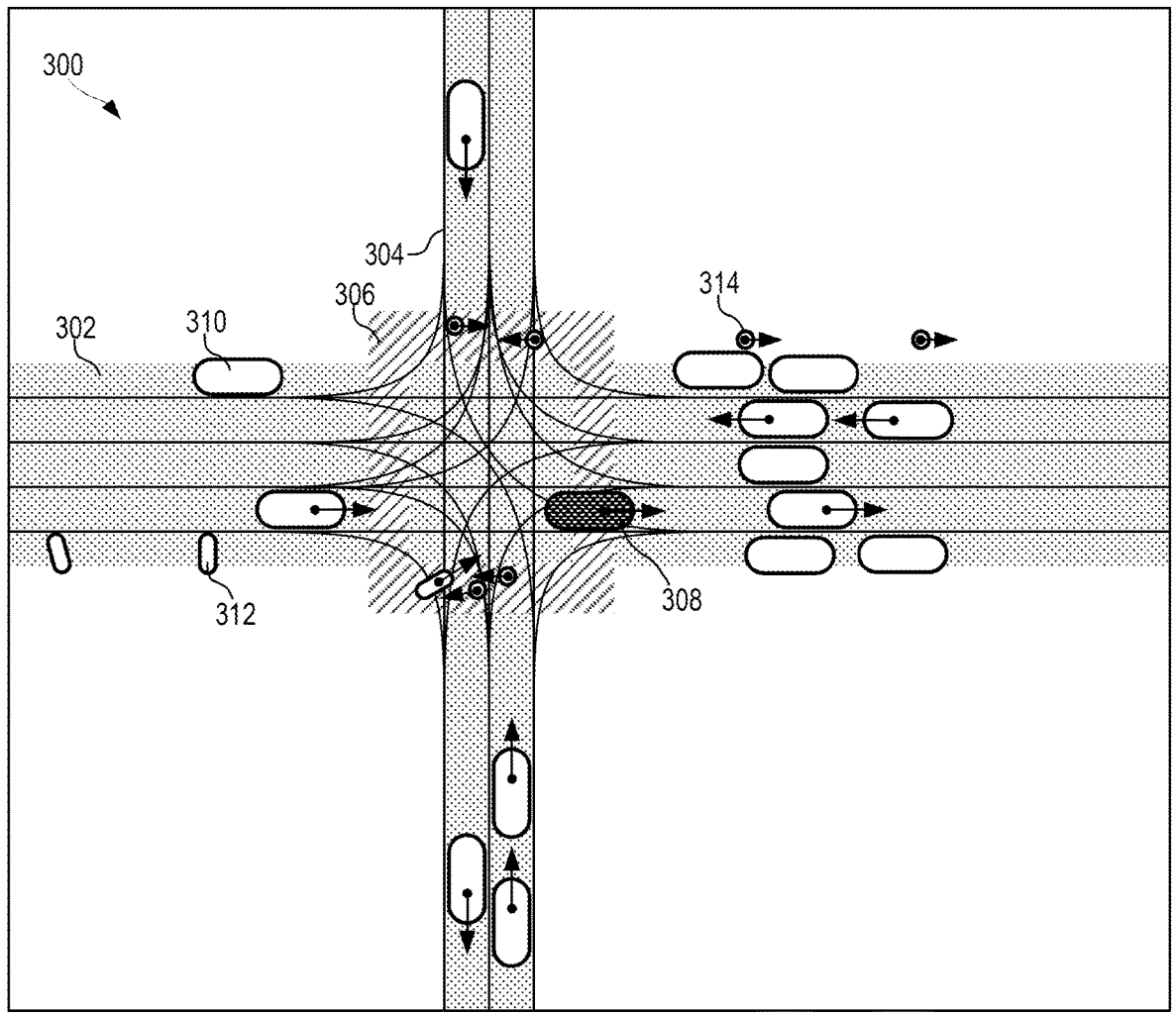
FIG. 3 is a representation of a traffic scene, according to some implementations of the present disclosure.

For instance, a simulated traffic scene can include data describing a layout of objects (e.g., actors) in the traffic scene. An example traffic scene is illustrated in FIG. 3 within a region of interest of an environment 300. The example traffic scene can include an area of an environment 300 designated as travel way(s) 302 (e.g., travel ways running laterally and longitudinally in environment 300). The example traffic scene can include lanes, such as may be demarcated by lane boundaries 304. The example traffic scene can include other features, such as other zones of the travel ways designated for one or more other purposes, such as a yield zone 306 (e.g., crosswalk).

The environment 300 contains a subject 308 (e.g., a subject vehicle, such as an autonomous vehicle 205) and a plurality of objects including objects 310, objects 312, and objects 314. Objects 310 can include, for example, vehicles traveling on the travel way (e.g., cars, trucks, autonomous vehicles, nonautonomous vehicles, etc.). Objects 312 can include, for example, smaller vehicles, such as bicycles, scooters, carts, and the like. Objects 314 can include, for example, smaller objects, such as pedestrians, animals, drones, carts, or substantially any other object in the environment 300. Any one or more of the objects (e.g., objects 310, objects 312, objects 314, etc.) can be associated with state data. For instance, state data can describe (e.g., for a given time, time period, etc.) an estimate of an object's current or past location (also referred to as position); current or past speed/velocity; current or past acceleration; current or past heading; current or past orientation; size/footprint (e.g., as represented by a bounding shape, object highlighting, etc.); class (e.g., pedestrian class vs. vehicle class vs. bicycle class, etc.), the uncertainties associated therewith, or other state information.

The simulated scene containing environment 300 can, in some implementations, be further processed. For example, a simulated traffic scene can be used for training an autonomous vehicle (e.g., autonomous vehicle 205) to better perceive and understand its environment (e.g., in traffic). For instance, a simulated traffic scene can be subsequently processed to obtain simulated sensor data (e.g., a simulation of sensor data 255) for a simulation of an autonomous vehicle containing sensors 235 (e.g., a simulation of autonomous vehicle 205 as subject vehicle 308). And in some implementations, the simulated sensor data generated for a simulated subject vehicle 308 in the simulated environment 300 can be labeled with the simulated state data to form a "ground truth" reference. Thus, one or more perception models can be trained to infer the "ground truth" from the simulated sensor data, and the output of the perception models can be evaluated with respect to the simulated scene data to update one or more parameters of the perception models.

Figure 4:
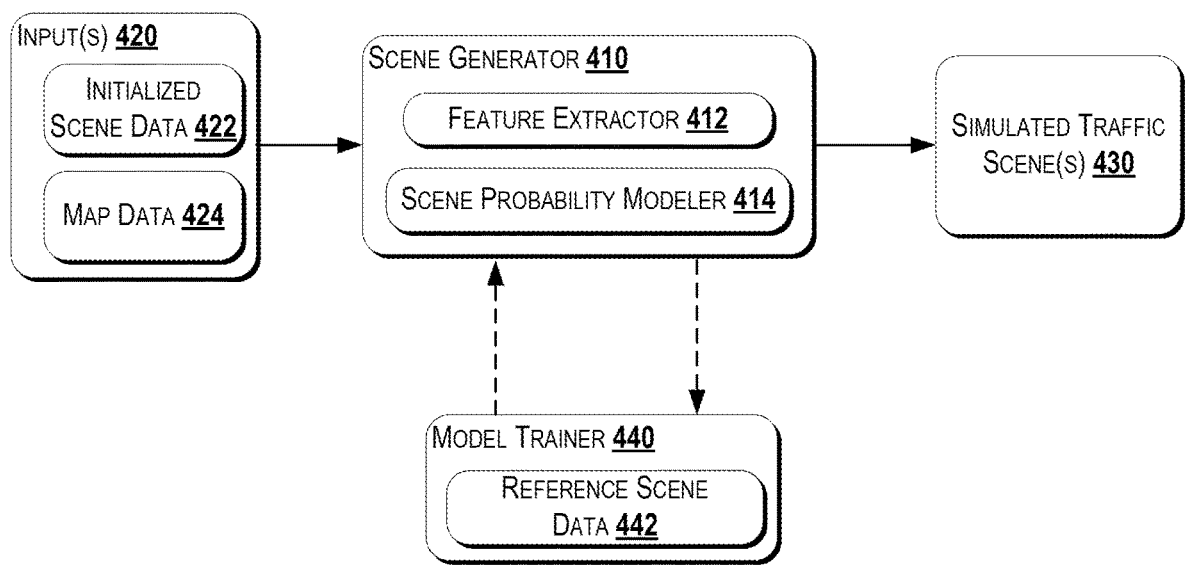
FIG. 4 is a block diagram of a simulated traffic scene generation system, according to some implementations of the present disclosure.

FIG. 4 depicts an example system 400 for generating environmental scenes according to example aspects of the present disclosure (e.g., a simulated traffic scene as illustrated in FIG. 3). An example scene generator 410 can receive inputs 420 and output simulated traffic scene(s) 430 (e.g., of an environment 300). The example scene generator 410 contains one or more machine-learned models that can be trained by model trainer 440 (e.g., by comparing outputs of the scene generator 410 to reference scene data 442).

The inputs 420 can include environmental data including initialized scene data 422 and map data 424. The initialized scene data 422 can include one or more data structures for containing the simulated traffic scenes 430. For instance, the initialized scene data 422 can include one or more image channels for storing information about the simulated environment, such as the location and any characteristics of objects in the environment. Map data 424 can include data descriptive of a real or fictional (e.g., simulated) environment and may include, for example, map data 260. For example, map data 424 can include high-resolution map data and corresponding contextual data. For example, in some implementations, map data 424 can include any one or more of: lane polygons (e.g., straight vehicle lanes, dedicated right vehicle lanes, dedicated left vehicle lanes, dedicated bus lanes, dedicated bike lanes, all lanes, left turn lanes, right turn lanes, intersection lanes, traffic-controlled lanes, etc.), optionally including traffic light state(s) (e.g., green, yellow, red, flashing yellow, flashing red, unknown, etc.), speed limit, orientation, and the like; lane centerlines and dividers (e.g., known allowed to cross, likely allowed to cross, possibly allowed to cross, unlikely allowed to cross, forbidden to cross, etc.); lane segments (e.g., straight vehicle lanes, dedicated right vehicle lanes, dedicated left vehicle lanes, etc.); drivable area polygons; road polygons; or crosswalk polygons; or other such map data. In some implementations, orientations can be expressed in Biternion representation. In some implementations, the environmental data provides semantic priors for the environment (e.g., the environment 300).

In some implementations, map data 424 can be expressed in one or more layers. In some implementations, map data 424 can include a plurality of layers, with each layer containing a different portion of the map data 424.

In some implementations, the initialized scene data 422 can be combined with the map data 424. For example, the initialized scene data 422 can include a plurality of layers (e.g., channels) that can be combined (e.g., stacked) with other layers of scene data and/or some or all of map data 424. In some implementations, the initialized scene data 422 can include one or more layers for locations of one or more of the subject vehicle (e.g., subject vehicle 308), various classes of objects (e.g., objects 310, 312, 314, etc., such as for classes of vehicles, bicycles, pedestrians, etc.), and/or one or more layers for other respective state data (e.g., orientations, headings, velocities, etc.) for the subject vehicle and any object(s).

The scene generator 410 can include a feature extractor 412 and a scene probability modeler 414. The feature extractor 412 and the scene probability modeler 414 can be or otherwise include one or more machine-learned models. In some embodiments, the feature extractor 412 and the scene probability modeler 414 can be included in the same model, and in some embodiments, the feature extractor 412 and the scene probability modeler 414 can be formed from different models. For instance, the scene generator 410 can include a machine-learned model framework containing a plurality of machine-learned models for generating simulated traffic scenes 430 from inputs 420, the plurality of machine-learned models including the feature extractor 412 and the scene probability modeler 414.

In some implementations, the feature extractor 412 can be configured to process the inputs 420 for input to the scene probability modeler 414. For example, in some embodiments, the feature extractor 412 can include one or more backbone models that, given an input scene (e.g., initialized scene data 422, map data 424, etc.), can encode a set of machine-learned features that describe or summarize the scene for feeding to the scene probability modeler 414.

In some implementations, the scene probability modeler 414 can be configured such that the simulated traffic scenes 430 are sampled from a joint probability distribution of an environment containing a subject vehicle and one or more objects. In some implementations, the joint probability distribution can be obtained and/or estimated using features extracted from the inputs 420 by the feature extractor 412. In some implementations, for example, given initialized scene data 422 as an input indicating a subject vehicle and map data 424, the scene probability modeler 414 can estimate a joint probability distribution for objects in the scene conditioned on the map data 424 and the indicated subject vehicle. In some implementations, given initialized scene data 422 as an input indicating a subject vehicle s E and map data m, the scene probability modeler 414 can estimate the joint distribution over objects in the scene $o_i \in \mathcal{A}$, where i=1, ..., n, which can be expressed as $p(o_1, ..., o_n|m,s)$.

In some implementations, the scene probability modeler 414 can include an autoregressive model, such as an autoregressive neural network. For example, an autoregressive model can be configured to factorize a joint distribution over d dimensions into a product of conditional distributions. For instance, in some examples the factorized joint distribution can be expressed as $p(x) = \Pi_{i=1}^{d} p(x_i|x_{<i})$. The individual conditional distributions can then be obtained or approximated. For instance, the conditional distributions can be estimated by one or more machine-learned models.

In some implementations, an arbitrary ordering of the generation procedure can be used to implement a factorization of a joint distribution into a plurality of conditional distributions. For example, in some implementations, a sampled scene from the joint probability distribution can be obtained or otherwise estimated by a scene generated by sequentially sampling objects for the scene. In this manner, for instance, a "joint" nature of the distribution can be captured by sampling over a plurality of iterations, with each iteration (e.g., to obtain $o_i$) conditioned on the iterations (e.g., $o_{<i}$, s) that came before. For example, in some implementations, a factorization of $p(o_1, ..., o_n|m,s)$ may be expressed as $p(o_1|m,s)\Pi_{i=2}^{n}p(o_i|o_{<i},m,s)$, for an arbitrary ordering of objects over i (e.g., left to right, top to bottom, clockwise, counterclockwise, etc.).

Figure 5A:
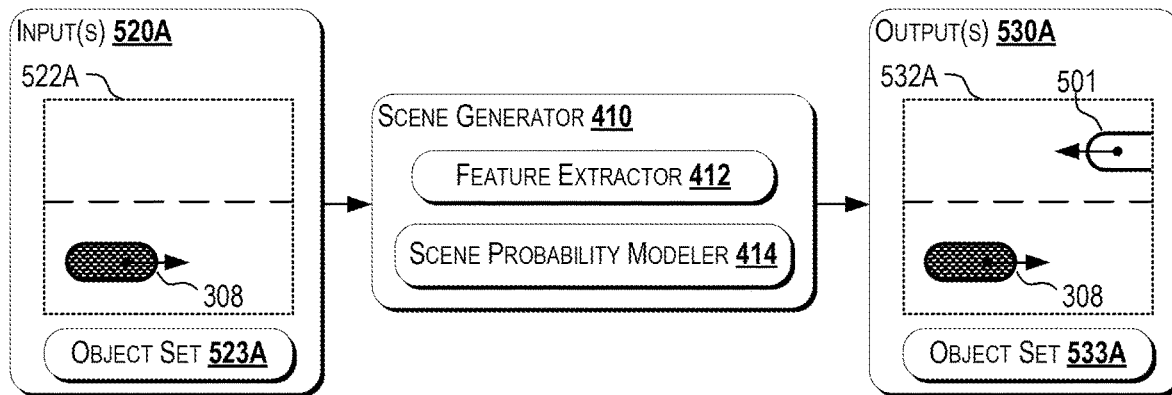
FIGS. 5A-5C are block diagrams of processing iterations of a simulated traffic scene generation system, according to some implementations of the present disclosure.
Figure 5B:
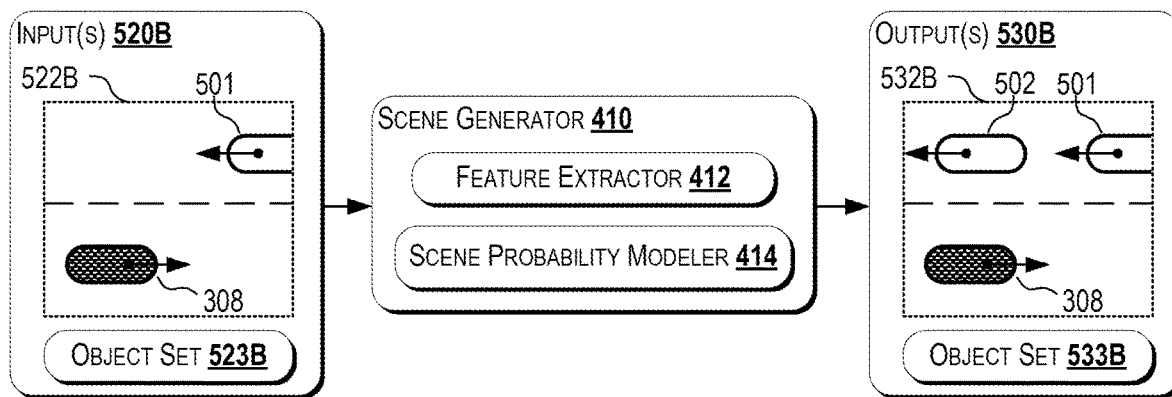
Figure 5C:
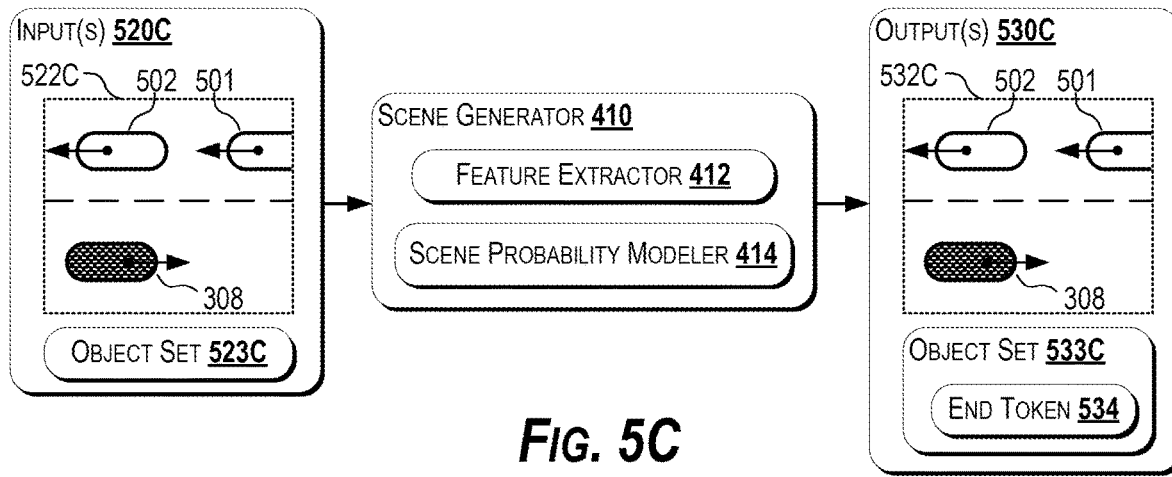

FIGS. 5A, 5B, and 5C illustrate three example iterations. In FIG. 5A, inputs 520A are provided to the scene generator 410. Inputs 520A include initialized environmental data descriptive of an initial scene 522A containing a subject vehicle 308 and an object set 523A on a map (e.g., the environmental data including map data 424). The object set 523A may be empty or populated. In some implementations, the object set 523A can be added by the scene generator 410 at the first iteration.

The scene generator 410 can produce outputs 530A containing updated environmental data based on (e.g., conditioned on) the inputs 520A. Updated environmental data can include an updated scene 532A and an updated object set 533A. For example, the updated scene 532A can include a new object 501. The new object can be inserted into the environment by updating or adding to the environmental data (e.g., by updating or adding to the object set 523A to obtain object set 533A, or by creating an object set 533A to obtain the object set 533A). In this manner, for example, the scene generator 410 can estimate a sample of a probability distribution for a new object 501 conditioned on a scene 522A including the subject vehicle 308 (e.g., including the initialized object set 523A), analogously to $p(o_1|m,s)$, for example.

In FIG. 5B, the inputs 520B contain the environmental data containing updated input scene 522B and input object set 523B, where the input scene 522B contains updated scene 532A and the input object set 523B contains output object set 533A. Accordingly, in the iteration depicted in FIG. 5B, scene generator 410 receives the environmental data output by the preceding iteration in FIG. 5A. The scene generator 410 can insert another new object 502 into the output scene 532B and update the object set 533B of outputs 530B based on (e.g., conditioned on) the input scene 522B including the subject vehicle 308 and the new object 501, analogously to $p(o_2|o_1,m,s)$, for example.

In FIG. 5C, the inputs 520C contain the environmental data containing updated input scene 522C and object set 523C, where the input scene 522C contains output scene 532B and the input object set 523C contains output object set 533B. Accordingly, in the iteration depicted in FIG. 5C, scene generator 410 receives the environmental data output by the preceding iteration in FIG. 5B. The scene generator 410 can insert another new object into the output scene 532C and update the object set 533C of outputs 530C based on (e.g., conditioned on) the input scene 522C including the subject vehicle 308, new object 501, and new object 502, analogously to $p(o_3|o_2,o_1,m,s)$, for example.

However, as illustrated in FIG. 5C, the object set 533C was updated with an end token 534, and no further new objects (e.g., vehicles) were inserted into the output scene 532C. For example, in FIG. 5C, the scene probability modeler 414 sampled the factorized joint probability distribution for the environment and obtained the end token 534 (e.g., sampled a distribution for a third new object conditioned on the inputs 520C containing the environment data, including the subject vehicle 308 and two new objects 501 and 502). Thus, the outputs 530C contain a simulated traffic scene corresponding to output scene 532C sampled from the joint distribution for the environment (e.g., as approximated by factorizing over the objects).

In some implementations, the subject vehicle and/or the objects (e.g., the elements of $\mathcal{A}$) can be parametrized by a multidimensional random variable. For example, one or more dimensions of the multidimensional random variable can include parameters of the subject vehicle and/or object. Example parameters include a class label (e.g., vehicle, pedestrian, bicycle or other personal mobility device, animal, robot, end token, etc.), a location (e.g., a spatial location, such as a location in a 2D coordinate plane of a map, such as a bird's-eye view location, etc.), a bounding box (e.g., a tuple defining the boundaries of the bounding box, such as by defining a length, a width, and an orientation), a centroid or center of gravity, a velocity, and the like. The initialized scene data 422 can include, in some examples, one or more parameters of the subject vehicle.

Figure 6:
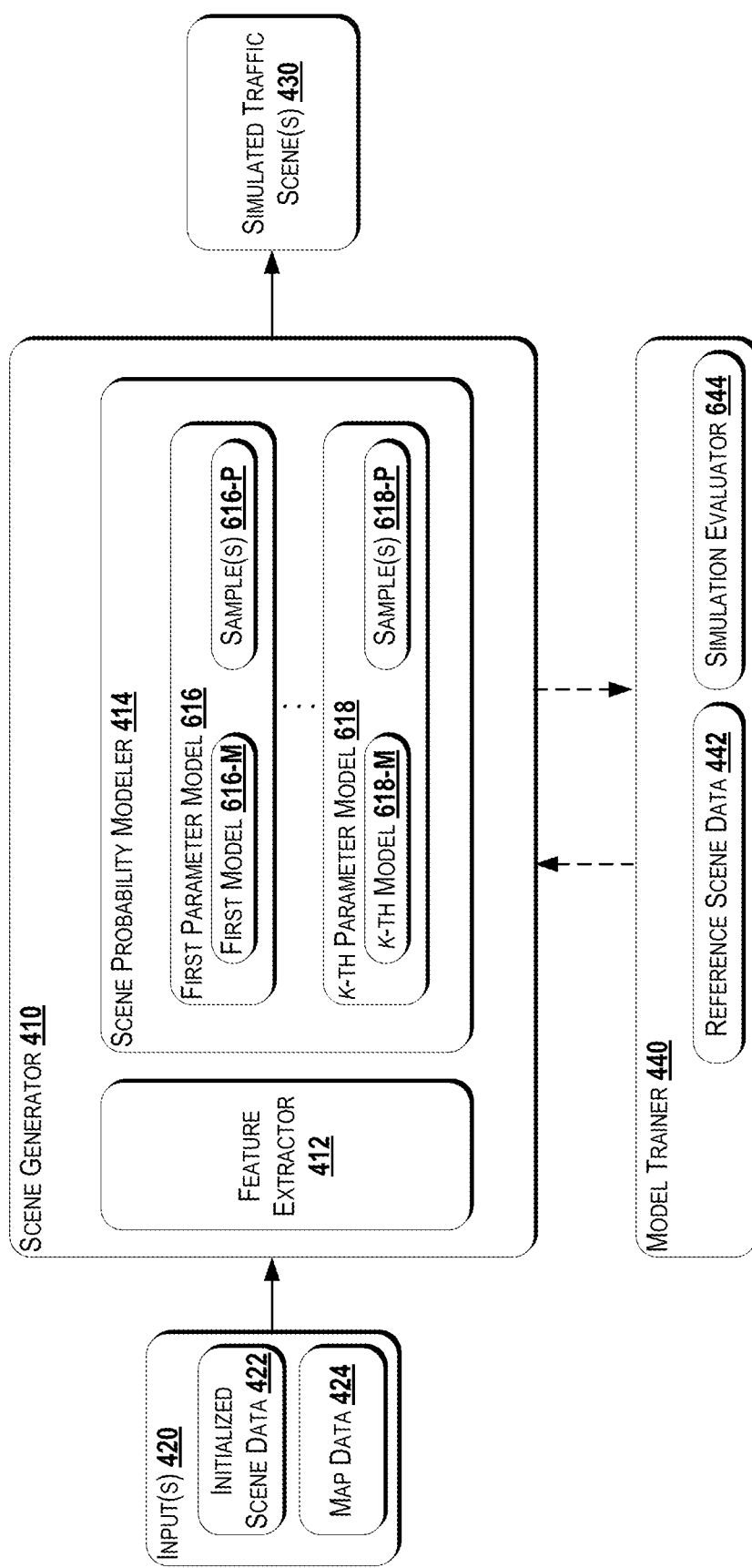
FIG. 6 is a block diagram of a simulated traffic scene generation system, according to some implementations of the present disclosure.

As shown in FIG. 6, in some implementations, the scene generator 410 can include a backbone feature extractor 412 feeding a plurality of prediction models of the scene probability modeler 414. For example, the scene probability modeler 414 can include one or more (e.g., a plurality) prediction models for determining values for a number of parameters of objects. A first parameter model 616 can include a first machine-learned model 616-M for obtaining a sample 616-P for the first parameter value. Likewise, the k-th parameter model 618 can include a k-th machine-learned model 618-M for obtaining a sample 618-P for the k-th parameter. Any one or more of (e.g., all of) the parameter models 616, 618, etc. can receive extracted features from the feature extractor 412 for sampling the samples 616-P, 618-P, etc.

For example, with reference to FIGS. 5A to 5C, each iteration can include sampling one or more parameters of new objects to add to the object set of environmental data. For example, in FIG. 5A, the scene probability modeler 414 can sample one or more parameters of new object 501, including, for instance, an object class, a position, an orientation, a bounding box, a velocity, etc. Each of the parameters can be sampled by respective machine-learned models (e.g., a k-th parameter model 618 for the k-th parameter). And in FIG. 5B, for instance, the scene probability modeler 414 can again sample one or more parameters of new object 502, including, for instance, an object class, a position, an orientation, a bounding box, a velocity, etc. And in FIG. 5C, for instance, the scene probability modeler 414 can again sample one or more parameters of another new object. In some implementations, for instance, an object class parameter distribution can include an end token effectively indicating that the next "new object" is an empty set—for example, that the input object set (e.g., object set 523C) contains all objects to be inserted into the scene. Accordingly, in FIG. 5C, when the sampled object class returns end token 534, the iterations stop and the output scene is generated as output scene 532C.

In some implementations, the k-th parameter model 618 can receive data from any preceding models (or all preceding models), such as the first parameter model 616 in FIG. 6. For example, in some implementations, the scene probability modeler 414 can further factorize the joint distribution for the environmental scene by factorizing the probabilities for an individual object $o_i$ over a plurality of dimensions (e.g., the k parameters of the object). For instance, a joint distribution for the object over its parameterization can be factorized into or otherwise estimated by a product of a plurality of probability distributions corresponding to distributions of parameters for that object in the environment (e.g., the environmental data of the current iteration). In some implementations, the factorized distribution for an object $o_i$ over parameters $h_j^{(i)}$, where j=1, ..., k, can be expressed as $p(o_i|o_{<i},m,s)=p(h_1^{(i)})\Pi_{j=2}^{k} p(h_j^{(i)}|h_{<j}^{(i)})$.

Thus, the joint distribution of each of the subject vehicle and any object(s) over the k parameters can be factorized (e.g., autoregressively factorized) into a product of a plurality of conditional probability distributions for each of the k parameters. Accordingly, the k-th parameter model 618 can receive data from one or more preceding models (or values sampled thereby), such that the output of the k-th parameter model 618 is responsive to (e.g., effectively conditioned on) the one or more preceding models (or values sampled thereby).

With reference again to FIGS. 5A to 5C, the feature extractor 412 can include one or more backbone models that, given an input scene for a respective iteration, can encode a set of features that describe the scene so far (e.g., over any preceding iterations). In some implementations, the feature extractor 412 can include one or more machine-learned models that capture long-range dependencies across a plurality of iterations. For example, in FIG. 5B, the feature extractor 412 can include a recurrent neural network to interpret and apply sequentially meaningful information about the scene generated in the iteration shown in FIG. 5A. Similarly, for example, in FIG. 5C, the feature extractor 412 can include a recurrent neural network to interpret and apply sequentially meaningful information about the scene generated in the iterations shown in FIGS. 5A and 5B. Example recurrent neural networks include long short-term memory models (LSTMs), such as LSTMs that process inputs while preserving spatial structure (e.g., ConvLSTMs, etc.). In some implementations, the feature extractor 412 can include (in addition to or as an alternative to a recurrent neural network) one or more convolutional neural networks to interpret and apply spatially meaningful information throughout the scene generation process. For example, in some implementations, the feature extractor 412 includes a convolutional neural network that receives an output from one or more recurrent neural networks and generates a set of backbone features extracted from the scene so far (e.g., up to the current iteration). The set of backbone features can be provided to the parameter models (e.g., parameter models 616, 618, etc.).

For instance, in some implementations, the feature extractor 412 can include, for the i-th iteration, an input multi-channel data structure (e.g., image) $x^{(i)} \in \mathbb{R}^{C \times H \times W}$ where C is the number of feature channels and H and W indicate the dimensions of the image grid. Given a set of previous hidden and cell states, $h^{(i-1)}$ and $c^{(i-1)}$, respectively, current hidden and cell states can be obtained according to $h^{(i)},c^{(i)}=\text{RNN}(x^{(i)},h^{(i-1)},c^{(i-1)})$, where RNN indicates a machine-learned model (e.g., including a recurrent neural network) using one or more of learnable parameters w. One or more outputs of RNN can be used, for example, to obtain a feature vector $f^{(i)}$ summarizing the scene so far (e.g., up to the present iteration). For example, one expression of some implementations includes $f^{(i)}=\text{CNN}(h^{(i)})$, where CNN indicates a machine-learned model (e.g., including a convolutional neural network) using one or more of learnable parameters w. In some implementations, RNN and CNN share one or more parameters. In some implementations, RNN and CNN use partially or completely disjoint subsets of parameters w. The feature vector $f^{(i)}$ can be provided to the parameter models (e.g., parameter models 616, 618, etc.) for obtaining one or more parameter value samples (e.g., samples 616-P, 618-P, etc.).

Figure 7:
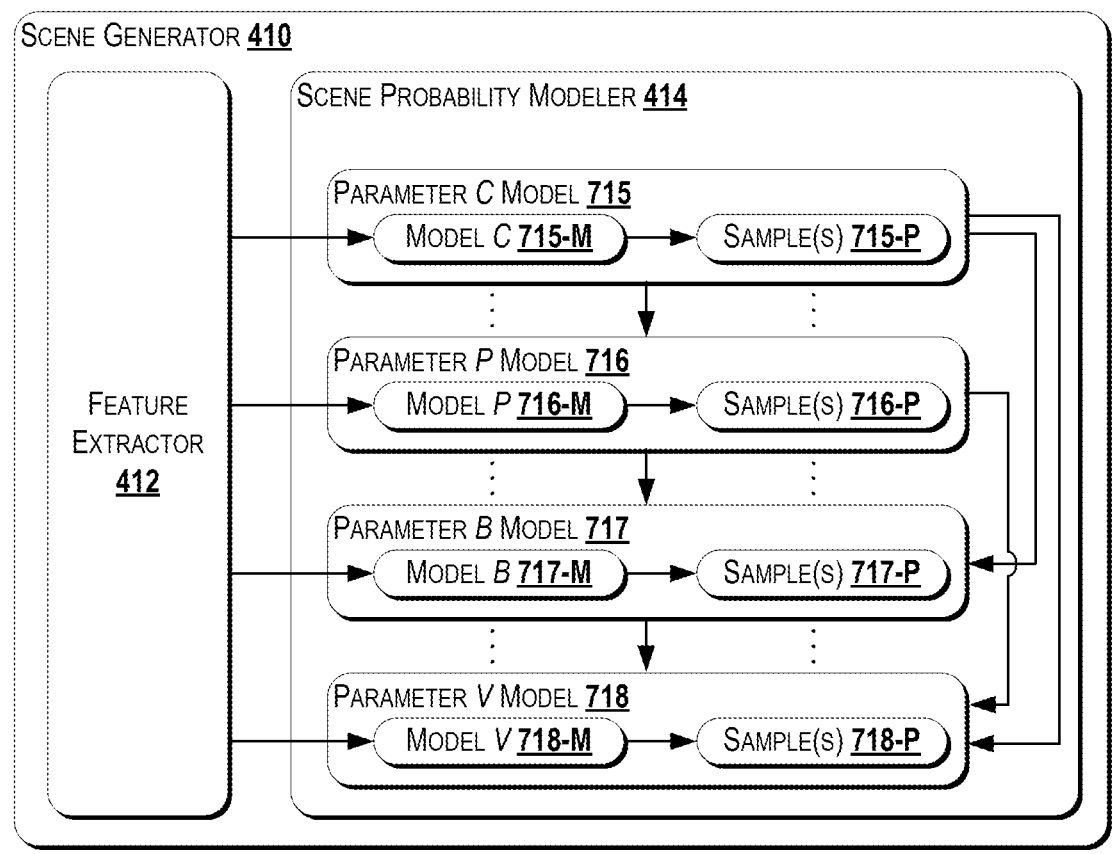
FIG. 7 is a block diagram of a simulated traffic scene generation system, according to some implementations of the present disclosure.

FIG. 7 depicts an example arrangement of a scene generator 410 with four example parameter models illustrated: parameter C model 715, containing machine-learned model C 715-M for obtaining parameter sample 715-P; parameter P model 716, containing machine-learned model P 716-M for obtaining parameter sample 716-P; parameter B model 717, containing machine-learned model B 717-M for obtaining parameter sample 717-P; and parameter V model 718, containing machine-learned model V 718-M for obtaining parameter sample 718-P. Each of the parameter models receives an input from the feature extractor 412 and provides an output to any subsequent parameter models. In this manner, for instance, parameter models 716, 717, and 718 are effectively conditioned on the parameter C model 715 (e.g., the model C 715-M, the sample 715-P, etc.). And in this manner, for instance, parameter models 717 and 718 are also effectively conditioned on the parameter P model 716 (e.g., the model P 716-M, the sample 716-P, etc.). And in this manner, for instance, parameter model 718 is also effectively conditioned on the parameter B model 717 (e.g., the model B 717-M, the sample 717-P, etc.).

In some implementations, parameters C, P, B, and V can correspond to, for example, a class, position, orientation, bounding box, and velocity of an object, respectively. For instance, in some implementations, for example, each of the subject vehicle and any object(s) can be parametrized by a class label $c_i \in \mathbb{C}$, , location $(x_i,y_i) \in \mathbb{R}^2$, , oriented bounding box $b_i \in \mathbb{B}$, , and velocity $v_i \in \mathbb{R}^2$,, to give a factorized distribution that may be expressed as $p(o_i|o_{<i},m,s)=p(c_i) p(x_i,y_i|c_i) p(b_i|x_i,y_i,c_i) p(v_i|b_i,x_i,y_i,c_i)$.

In some implementations, a distribution over an object's class can be modeled (e.g., by model C 715-M) using a distribution obtained according to one or more machine-learned parameters. In some implementations, a discrete distribution can be used with one or more machine-learned parameters (e.g., probabilities). For instance, one example distribution is a categorical distribution having a support being the set of classes $\mathbb{C}$ (e.g., including an end token class label) and having parameters predicted by a machine-learned model (e.g., a neural network having a plurality of layers, such as a multi-layer perception, etc.). For instance, a sample 715-P $c_i$ can be obtained in some implementations as $c_i \sim \text{Categorical}(\pi_c)$, where $\pi_c$ are parameters of the categorical distribution obtained as $\pi_c = \text{MLP}_c(\text{avgpool}(f^{(i)}))$, where MLP indicates a machine-learned model having learnable weights (e.g., one or more of learnable weights w) and avgpool indicates average pooling over the spatial dimensions (e.g., $\mathbb{R}^{C \times H \times W} \to \mathbb{R}^C$).

In some implementations, a distribution over an object's position can be modeled (e.g., by model P 716-M) by a distribution obtained according to one or more machine-learned parameters (e.g., a continuous distribution over space, a discrete distribution over segments, etc.). In some implementations, a discrete distribution over one or more segmented areas of the environment (e.g., environment 300) can be used with one or more machine-learned probabilities for the segmented area. For instance, some implementations can use a categorical distribution having as support a number of quantized bins within a region of interest (e.g., an environment 300) and having parameters predicted by a machine-learned distribution parameter prediction model (e.g., a convolutional neural network trained for class-specific distribution parameter prediction). (In some implementations, a continuous output may be obtained by treating the contents of each bin as uniformly distributed.) For instance, the machine-learned distribution parameter prediction model can receive as inputs the feature vector from the feature extractor 412 and the sampled class label and return as an output a set of parameters for determining a distribution of the object's position. In this manner, for instance, the parameters of the distribution of position can be effectively conditioned on the sampled class for the object. In some implementations, the machine-learned distribution parameter prediction model can use separately-trained weights for each of a plurality of class labels. In some implementations, certain classes of objects (e.g., pedestrians, animals, etc.) may not be provided a bounding box, and may be simulated based on a center of gravity only (e.g., a bounding box with zero dimensions).

For example, in some implementations, the distribution parameters can be expressed as $\pi_{loc} = \text{CNN}_{loc}(f^{(i)}, c_i)$ where CNN indicates a machine-learned model (e.g., including a convolutional neural network) using one or more of a set of learnable parameters w. In some implementations, $\text{CNN}_{loc}$ contains one or more softmax activations for the input class $c_i$. The parameters $\pi_{loc}$ can include mixture parameters (e.g., an n-simplex or a portion thereof) and can be used to retrieve a sampled quantized bin index $q \sim \text{Categorical}(\pi_c)$ to obtain a sampled coordinate pair $(x_i, y_j) \sim \text{Uniform}(\min(p_q), \max(p_q))$, where $\min(p_q)$ and $\max(p_q)$ respectively indicate the minimum and maximum continuous coordinates in the q-th bin. In some implementations, $\pi_{loc}$ may be masked and normalized during inference such that quantized bins containing invalid positions (e.g., according to the ordering of the inserted objects) have a decreased probability mass (e.g., zero probability mass). In some implementations, $\pi_{loc}$ may also optionally be masked in training. In some implementations, a local feature vector may be obtained by spatially indexing within the feature vector extracted by the feature extractor 412. The local feature vector can encode local information (e.g., at or within the vicinity of $(x_i, y_j)$, as represented by $f_{x_i, y_j}^{(i)} \in \mathbb{R}^C$.

In some implementations, a distribution over an object's bounding box parameters (e.g., size, orientation, etc.) can be modeled (e.g., by model B 717-M) by a distribution obtained according to one or more machine-learned parameters (e.g., a continuous distribution over a continuous set of parameters, a discrete distribution over portions or subsets, etc.).

In some examples, a distribution over an object's bounding box size parameters can be multi-modal. For instance, a class of "vehicle" may have one or more modalities corresponding to one or more types of vehicles (e.g., car, truck, bus, etc.) while also admitting variability within each mode (e.g., a distribution of car sizes, a distribution of truck sizes, etc.). In some implementations, a distribution over an object's bounding box size parameters (e.g., length and width, perimeter and aspect ratio, etc.) can be modeled as a mixture of a number of bivariate distributions (e.g., bivariate log-normal distributions). For example, a machine-learned distribution parameter prediction model can receive a local feature vector as an input (e.g., based on a sampled position for the object) along with the previously-sampled class label. In this manner, for instance, the parameters of the distribution can be effectively conditioned on the sampled class for the object as well as the sampled position. In some implementations, the machine-learned distribution parameter prediction model can use separately-trained weights for each of a plurality of class labels. In some implementations, the machine-learned distribution parameter prediction model can output a set of mixture weights (e.g., an n-simplex or portion thereof) and corresponding sets of distribution parameters of one or more component distributions (e.g., mean, standard deviation, covariance, etc.). The mixture weights can be used to sample a categorical distribution to obtain an index j for sampling the bounding box size parameters from the corresponding component distribution of the j-th set of distribution parameters output by the machine-learned distribution parameter prediction model.

For example, in some implementations, the mixture weights and distribution parameters for the distributions of bounding box parameters can be expressed respectively as $\pi_{box}$, $\mu_{box}$, and $\Sigma_{box}$, and obtained as $[\pi_{box}, \mu_{box}, \text{and } \Sigma_{box}] = \text{MLP}_{box}(f_{x_i, y_i}^{(i)}, c_i)$, where MLP indicates a machine-learned model having learnable weights (e.g., one or more of learnable weights w) and a plurality of layers (e.g., a multilayer perceptron). The bounding box parameter values (e.g., length and width) can be sampled from a selected component distribution (e.g., selected according to a sampled index value), for example, $\text{LogNormal}(\mu_{box,j}, \Sigma_{box,j})$, where j is sampled from $\text{Categorical}(\pi_{box})$ and $\mu_{box,j} \in \mathbb{R}^2$ and $\Sigma_{box,j} \in \mathbb{S}_+^2$. In some implementations, $\text{MLP}_{box}$ can predict a Biternion representation of $\mu$ as $\mu = (\cos \mu, \sin \mu)$. In some implementations, $\kappa$ can be predicted in log scale. In some implementations, $\text{MLP}_{box}$ can predict a variance term (e.g., $\sigma^2 \in \mathbb{R}_{>0}^2$, in log scale) and a correlation term (e.g., $\rho \in [-1, 1]$, using tan h) such that $\Sigma$ forms a covariance matrix, such as a matrix containing, for instance, $$\sum = \begin{bmatrix} \sigma_1^2 & \rho\sigma_1\sigma_2 \\ \rho\sigma_1\sigma_2 & \sigma_2^2 \end{bmatrix} \in \mathbb{S}_+^2.$$

In a similar manner, an orientation of the object's bounding box (e.g., a heading) can be multi-modal. For example, an object can traverse an environment along a plurality of different heading modes (e.g., going straight, turning at an intersection, etc.), while also admitting variability within each mode (e.g., a distribution of effectively "straight" headings, a distribution of headings effective to complete a turn, etc.). Accordingly, in some implementations, a distribution over an object's heading or bounding box orientation can be modeled as a mixture of a number of distributions (e.g., Von Mises distributions). For example, a machine-learned distribution parameter prediction model can receive a local feature vector as an input (e.g., based on a sampled position for the object) along with the previously-sampled class label. In this manner, for instance, the parameters of the distribution can be effectively conditioned on the sampled class for the object as well as the sampled position. In some implementations, the machine-learned distribution parameter prediction model can use separately-trained weights for each of a plurality of class labels. In some implementations, the machine-learned distribution parameter prediction model can output a set of mixture weights (e.g., an n-simplex or portion thereof) and corresponding sets of distribution parameters of one or more component distributions (e.g., mean, standard deviation, covariance, radial analogues thereof, etc.). The mixture weights can be used to sample a categorical distribution to obtain an index j for sampling the orientation parameter(s) from the corresponding component distribution of the j-th set of distribution parameters output by the machine-learned distribution parameter prediction model.

For example, in some implementations, the mixture weights and distribution parameters for the distributions of orientations can be expressed respectively as $\pi_\theta$, $\mu_\theta$, and $\kappa_\theta$, and obtained as $[\pi_\theta, \mu_\theta, \kappa_\theta] = MLP_\theta(f_{x_i,y_i}^{(i)}, c_i)$, where MLP indicates a machine-learned model having learnable weights (e.g., one or more of learnable weights w) and a plurality of layers (e.g., a multilayer perceptron). The orientation $\theta_i$ can be sampled from component distributions, for example, VonMises($\mu_{\theta,j}, \kappa_{\theta,j}$), where j is sampled from Categorical($\pi_\theta$) and $\mu_{\theta,j} \in [0, 2\pi)$ and $\kappa_{\theta,j} > 0$.

In some implementations, a distribution over an object's velocity (e.g., speed, direction, etc.) can be modeled (e.g., by model V 718-M) by a distribution obtained according to one or more machine-learned parameters (e.g., a continuous distribution over a continuous set of parameters, a discrete distribution over portions or subsets, etc.). The distribution may include one or more modes. For example, objects at a higher speed (e.g., near a speed limit for the environment) may have one or more clusters of direction (e.g., clustered around the direction(s) for traveling within one or more lanes through the environment), whereas objects at a lower speed (e.g., a zero velocity) might be more likely to assume substantially any direction. In some examples, the distribution of object velocity can be modeled as a mixture of one or more distributions of the parameterization of the velocity (e.g., speed and direction). In some implementations, the mixture can be modeled as a bivariate distribution of the parameterization. In some implementations, the mixture can be modeled as two separate distributions of each parameter (e.g., a Log-Normal distribution for speed, a Von Mises distribution for direction, etc.) In some instances, the direction can be parametrized in terms of the bounding box orientation $\theta$. In some implementations, the mixture can include at least one component distribution corresponding to a speed of zero.

For example, a machine-learned distribution parameter prediction model can receive a local feature vector as an input (e.g., based on a sampled position for the object) along with the previously-sampled class label. In this manner, for instance, the parameters of the distribution can be effectively conditioned on the sampled class for the object as well as the sampled position, as well as on the bounding box (e.g., the orientation thereof) for parameterizing the direction. In some implementations, the machine-learned distribution parameter prediction model can use separately-trained weights for each of a plurality of class labels. In some implementations, the machine-learned distribution parameter prediction model can output a set of mixture weights (e.g., an n-simplex or portion thereof) and corresponding sets of distribution parameters of one or more component distributions (e.g., mean, standard deviation, covariance, radial analogues thereof, etc.). The mixture weights can be used to sample a categorical distribution to obtain an index j for sampling the orientation parameter(s) from the corresponding component distribution of the j-th set of distribution parameters output by the machine-learned distribution parameter prediction model. The index can be used to select a set of distribution parameters for sampling a component distribution for the parameters of the velocity (e.g., sample a speed distribution, sample a direction distribution, etc.). In some implementations, each of a speed distribution and a direction distribution can have parameters predicted by one or more other machine-learned distribution parameter prediction models.

For example, in some implementations, the mixture weights for the distributions of orientations can be expressed as $\pi_v$, where $\pi_v$ can be obtained as $$\pi_v = MLP_v(f_{x_i,y_i}^{(i)}, c_i),$$

where MLP indicates a machine-learned model having learnable weights (e.g., one or more of learnable weights w) and a plurality of layers (e.g., a multilayer perceptron). An index j (e.g., a component index) can be sample using the mixture parameters from a component distribution for the speed of the object and from a component distribution for the direction of the object. For example, a sample from a speed distribution can be expressed, in some examples, as $u_i \sim \text{LogNormal}(\mu_{u,j}, \sigma_{u,j})$, where $u_i \in \mathbb{R}_{\geq 0}$ and where the distribution parameters ($\mu_{u,j}, \sigma_{u,j}$) can be obtained from $$[\mu_u, \sigma_u] = MLP_u(f_{x_i,y_i}^{(i)}, c_i),$$

where MLP indicates a machine-learned model having learnable weights (e.g., one or more of learnable weights w) and a plurality of layers (e.g., a multilayer perceptron). For example, a sample from a direction distribution can be expressed, in some examples, as $\omega_i \sim \text{VonMises}(\mu_{\omega,j}, \kappa_{\omega,j})$, where $\omega_i \in [0, 2\pi)$ and where the distribution parameters ($\mu_{\omega,j}, \kappa_{\omega,j}$) can be obtained from $$[\mu_\omega, \kappa_\omega] = MLP_\omega(f_{x_i,y_i}^{(i)}, c_i),$$

where MLP indicates a machine-learned model having learnable weights (e.g., one or more of learnable weights w) and a plurality of layers (e.g., a multilayer perceptron).

In some implementations of the scene probability modeler 414, at each scene generation step (e.g., each iteration), any one, some, or all of the parameter models (e.g., from the first model 616-M to the k-th model 618-M, including models 715-M, 716-M, 717-M, 718-M, etc.) can be sampled repeatedly to obtain a plurality of samples. In some implementations, the effective sample (e.g., the sample used to parameterize the new object, such as new object 501, 502, etc.) can be obtained using the plurality of samples (e.g., a combination thereof, a selection therefrom, etc.). For example, the effective sample can be selected according to the most likely sample of the plurality of samples. Additionally, in some examples, invalid samples can be excluded from consideration (e.g., sample object parameterizations having overlapping bounding boxes, etc.).

With reference again to FIG. 6, the model trainer 440 can include a simulation evaluator 644 for evaluating one or more outputs (e.g., final outputs, intermediate outputs, etc.) of the scene generator 410. For example, the simulation evaluator 644 can include an objective for training. For example, the simulation evaluator 644 can input one or more instances of reference scene data 442 to the scene generator 410 and subsequently evaluate a corresponding simulation thereof.

For example, reference scene data 442 can include reference traffic scene data. Reference traffic scene data can include the state data for a subject vehicle and/or one or more objects in an environment, as well as map data for the environment. The reference scene data 442 can include real-world traffic scene recordings, such as recordings obtained with image captures (e.g., still or video) and/or other sensory recordings (e.g., point clouds, etc.). For example, the reference scene data 442 can include recordings from one or more sensors on an autonomous vehicle (e.g., autonomous vehicle 205), although the reference scene data 442 can also be obtained from recordings from one or more sensors not on a vehicle (e.g., on a pole at an intersection, etc.). The scene generator 410 can receive the reference scene data 442, extract features therefrom using the feature extractor 412, and generate a joint probability distribution (e.g., a factorization thereof) for the traffic scene described by the reference traffic scene data.

In some implementations, the simulation evaluator 644 evaluates the probability distribution(s) generated by the scene generator 410 for a set of instances of reference scene data 442. For example, an objective may include increasing the joint probability of a set of reference scenes (e.g., decreasing a negative probability). In some implementations, the probabilities evaluated over the reference scenes can include a cross-entropy loss between one or more predicted parameters and the corresponding characteristics of the reference scene.

For example, an objective in some implementations can include an update objective $$w^* = \operatorname*{argmax}_{w} \sum_{i=1}^{N}$$

log $p(o_{i,1}, \ldots, o_{i,n}|m_i,s_i;w)$, where $w^*$ is a set of updated parameters, w is a set of learnable parameters, N is the number of reference scenes in the reference scene data 442, n is a number of objects in the i-th reference scene, $m_i$ is the map data of the i-th reference scene of the reference data 442, and $s_i$ is the subject vehicle for the i-th reference scene of the reference scene data 442. For example, for each reference scene, $p(o_{i,1}, \ldots, o_{i,n}|m_i,s_i;w)$ can be determined as factorized above.

In some implementations, model trainer 440 can use teacher forcing and/or backpropagation techniques for updating parameters of the scene generator 410. In some implementations, training is carried out over a plurality of mini-batches. Optimizers can be used in some examples in each minibatch (e.g., an Adam optimizer).

Figure 8:
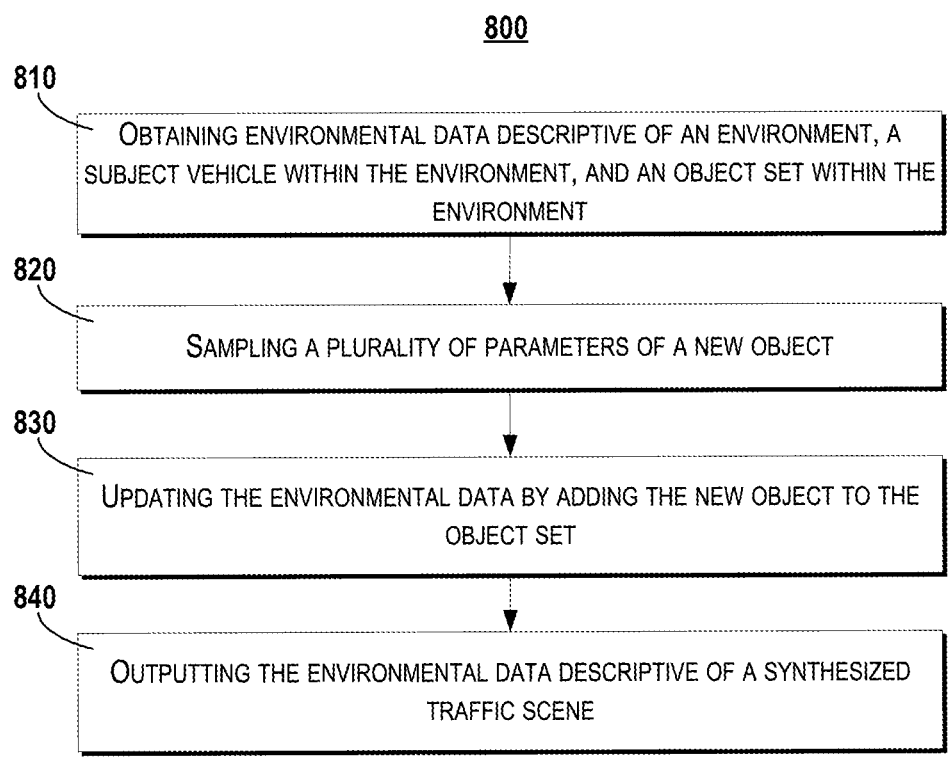
FIG. 8 is a flowchart of an example method for simulated traffic scene generation, according to some implementations of the present disclosure.

FIG. 8 depicts a flowchart of a method 800 for generating simulated traffic scenes (e.g., using a scene generator 410, such as is discussed above with respect to FIGS. 3 to 7) according to aspects of the present disclosure. One or more portion(s) of the method 800 can be implemented by a computing system that includes one or more computing devices such as, for example, the computing systems described with reference to the other figures (e.g., autonomous platform 105, vehicle computing system 210, operations computing system(s) 290A, remote computing system(s) 290B, system 400, a system of FIG. 11, etc.). Each respective portion of the method 800 can be performed by any (or any combination) of one or more computing devices. Moreover, one or more portion(s) of the method 800 can be implemented on the hardware components of the device(s) described herein (e.g., as in FIGS. 1, 2, 4, 5A to 5C, 6, 7, 11, etc.), for example, to generate simulated traffic scenes. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 8 is described with reference to elements/terms described with respect to other systems and figures for exemplary illustrated purposes and is not meant to be limiting. One or more portions of method 800 can be performed additionally, or alternatively, by other systems.

At 810, example method 800 includes obtaining environmental data (e.g., inputs 420, etc.) descriptive of an environment, a subject vehicle within the environment, and an object set within the environment. Environmental data can include any data descriptive of an environment and actors and other objects within the environment. An environment can include, for example, an environment 110 containing an autonomous platform 105 and object(s) 130. An environment can include, for example, environment 300 containing a subject vehicle 308 and an object set containing objects 310, 312, 314, etc. Data descriptive of an environment can include past and/or present state data for the environment and any objects in the environment, any measurements of the environment and/or its contents (e.g., sensor data 255, map data 260, perception data 275A, etc.).

In some implementations, example method 800 at 810 includes obtaining environmental data descriptive of a pre-populated object set (e.g., an object set containing one or more objects, etc.). In some implementations, example method 800 at 810 includes obtaining environmental data descriptive of an empty object set configured for insertion of new objects according to various implementations of the present disclosure. Furthermore, although obtaining environmental data descriptive of an object set is indicated at 810 in example method 800, it is to be understood that one or more entries in the object set (e.g., one or more objects, etc.) can be inserted into the object set throughout the operations of example method 800 to update or create the object set, including, for example, the insertion of a new object (e.g., initiating or creating the object set) at 830. In this example manner, for instance, obtaining environmental data descriptive of an object set can be cooperatively performed across and throughout the operations of example method 800.

In some implementations of the example method, the environmental data obtained at 810 can include a collection of polygons and polylines that provide semantic priors for a region of interest around the subject vehicle. In some implementations of the example method, the environmental data obtained at 810 can include a multi-channel image encoding of a top-down view of the environment.

At 820, example method 800 includes sampling a plurality of parameters of a new object. In some implementations of example method 800, the plurality of parameters include one or more of: an object class, an object position, an object bounding box, or an object velocity. In some implementations of example method 800, the plurality of parameters can be sampled respectively from a plurality of probability distributions. In some implementations of example method 800, the plurality of probability distributions can be sequentially generated by a machine-learned traffic scene generation model (e.g., scene generator 410) and can be based at least in part on the environmental data. In some implementations of example method 800, at least one of the plurality of probability distributions is conditioned upon one or more of the plurality of probability distributions that were previously sequentially generated.

In some implementations of example method 800, the machine-learned traffic scene generation model includes a shared backbone feature extraction portion (e.g., feature extractor 412) that extracts features from the environmental data and a plurality of prediction models (e.g., of scene probability modeler 414, such as first parameter model 616 to k-th parameter model 618, parameter models 715, 716, 717, 718, etc.) that respectively generate the plurality of probability distributions based at least in part on the features. In some implementations of example method 800, the machine-learned traffic scene generation model includes an autoregressive model including a convolutional long short-term memory neural network. For instance, the shared backbone feature extraction portion can, in some implementations, include a long short-term memory neural network, such as a convolutional long short-term memory neural network. In some implementations of example method 800, the plurality of prediction models autoregressively factorize a joint probability distribution of a synthesized traffic scene described by the environmental data.

At 830, example method 800 includes updating the environmental data by adding the new object to the object set.

At 840, example method 800 includes outputting the environmental data descriptive of a synthesized traffic scene. In some implementations of example method 800, the example method includes iteratively performing operations 820 and 830 for a plurality of iterations to obtain a plurality of new objects (e.g., before proceeding to 840). In some implementations of example method 800, each of the plurality of new objects is obtained based at least in part on environmental data updated by a prior iteration. In this manner, for example, the sampling of new objects for the scene can be conditioned on the object(s) already in the scene. In some implementations of the example method, for a final iteration of the plurality of iterations, the plurality of parameters include an end token that, when sampled, results in termination of the plurality of iterations.

In some implementations of the example method, the machine-learned traffic scene generation model is configured to determine a joint probability distribution of the synthesized traffic scene over the object set, conditioned on the subject vehicle. In some implementations of the example method, the joint probability distribution is autoregressively factorized (e.g., by the plurality of prediction models) and includes the plurality of probability distributions. In some implementations of the example method, the machine-learned traffic scene generation model has been trained by optimizing (e.g., maximizing) a likelihood of real-world traffic scenes contained in a training dataset.

Figure 9A:
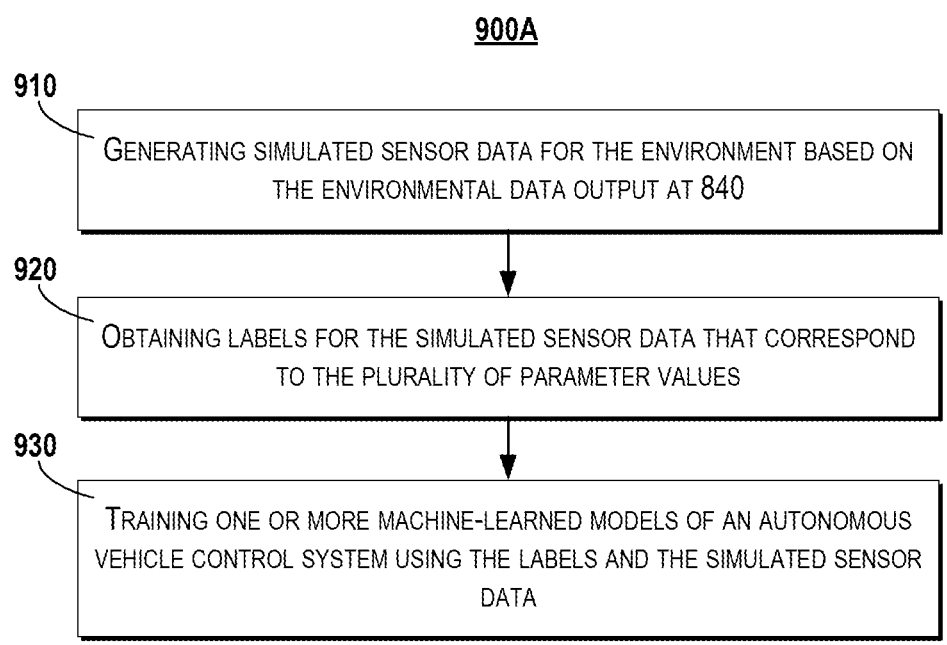
FIG. 9A is a flowchart of an example method for training a machine-learned model using simulated traffic scenes, according to some implementations of the present disclosure.

FIG. 9A depicts a flowchart of a method 900A for generating and using simulated training data from simulated traffic scenes (e.g., using a scene generator 410, such as is discussed above with respect to FIGS. 3 to 7) according to aspects of the present disclosure. One or more portion(s) of the method 900A can be implemented by a computing system that includes one or more computing devices such as, for example, the computing systems described with reference to the other figures (e.g., autonomous platform 105, vehicle computing system 210, operations computing system(s) 290A, remote computing system(s) 290B, system 400, a system of FIG. 11, etc.). Each respective portion of the method 900A can be performed by any (or any combination) of one or more computing devices. Moreover, one or more portion(s) of the method 900A can be implemented on the hardware components of the device(s) described herein (e.g., as in FIGS. 1, 2, 4, 5A to 5C, 6, 7, 11, etc.), for example, to generate simulated traffic scenes or training therewith. FIG. 9A depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 9A is described with reference to elements/terms described with respect to other systems and figures for exemplary illustrated purposes and is not meant to be limiting. One or more portions of method 900A can be performed additionally, or alternatively, by other systems.

As depicted in FIG. 9A, example method 900A can include generating simulated sensor data for the environment based on the environmental data output by example method 800 at 840. For example, simulated sensor data can include simulation of output(s) of any of sensor(s) 235, such as simulations of any of sensor data 255, such as any inputs for generating perception data 275A. For example, simulated sensor data can be indicative of one or more objects within the surrounding environment of a subject vehicle (e.g., the subject vehicle 308). The object(s) can include, for example, vehicles, pedestrians, bicycles, or other objects. In some implementations, the simulated sensor data can be indicative of a static background of the environment. Simulated sensor data can, in some implementations, include simulated data for at least two different types of sensor(s). For instance, a subject vehicle in an environment can be simulated as sensing the environment with a plurality of sensors (e.g., location sensors, 2D imaging sensors, 3D imaging sensors, etc.). For example, simulated sensor data can include, in some implementations, point cloud data corresponding to simulated object(s) in the simulated environment (and/or the environment itself) from the subject vehicle's perspective, camera (mono imaging, stereo imaging, etc.) data corresponding to simulated object(s) in the simulated environment (and/or the environment itself) from the subject vehicle's perspective, and the like.

At 920, example method 900A can include obtaining labels for the simulated sensor data that correspond to the plurality of parameter values. In some implementations, the labels can be derived from or contain the plurality of parameter values. For example, in some implementations, a portion of the sensor data can be labeled as associated with a vehicle by reference to a corresponding class parameter value of "vehicle" (e.g., as sampled from a corresponding probability distribution of class values, etc.). Any of or all of a plurality of parameter values (e.g., the plurality of parameter values of method 800 at 820) can likewise (or otherwise) correspond to one or more labels for the simulated sensor data.

At 930, example method 900A can include training one or more machine-learned models of an autonomous vehicle control system using the labels and the simulated sensor data. For example, the one or more machine-learned models can include models used to perform the perception 270A, prediction 270B, or motion planning 270C functions for an autonomous vehicle 205. In some implementations, the models can be trained by the one or more remote computing system(s) 290B, the operations computing system 290A, or any other device (e.g., remote servers, training computing systems, etc.) remote from or onboard the vehicle 205. For example, the one or more machine-learned models can be trained by a training computing system over simulated training data stored in a training database.

Figure 9B:
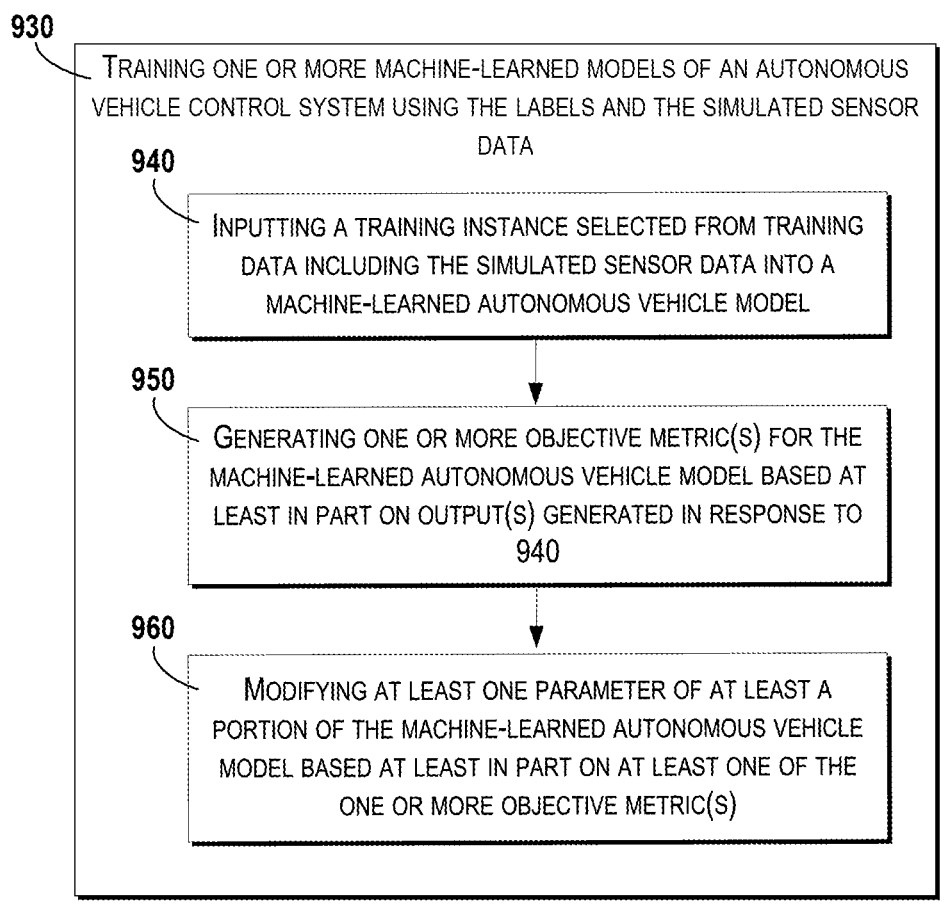
FIG. 9B is a flowchart of an example method for training another machine-learned model using simulated traffic scenes, according to some implementations of the present disclosure.

FIG. 9B depicts a flowchart of a method 900B for performing method 900A at 930 for training one or more example machine-learned models (e.g., a perception model, etc.) using simulated traffic scenes generated by a scene generator model (e.g., scene generator 410) according to aspects of the present disclosure. One or more portion(s) of the method 900B can be implemented by a computing system that includes one or more computing devices such as, for example, the computing systems described with reference to the other figures (e.g., autonomous platform 105, vehicle computing system 210, operations computing system(s) 290A, remote computing system(s) 290B, system 400, a system of FIG. 11, etc.). Each respective portion of the method 900B can be performed by any (or any combination) of one or more computing devices. Moreover, one or more portion(s) of the method 900B can be implemented on the hardware components of the device(s) described herein (e.g., as in FIGS. 1, 2, 4, 5A to 5C, 6, 7, 11, etc.), for example, to train machine-learned models. FIG. 9B depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 9B is described with reference to elements/terms described with respect to other systems and figures for exemplary illustrated purposes and is not meant to be limiting. One or more portions of method 900B can be performed additionally, or alternatively, by other systems.

At 940, the method 900B can include inputting a training instance selected from training data including the simulated sensor data (e.g., of method 900A at 910) into a machine-learned autonomous vehicle model. In some implementations, the machine-learned autonomous vehicle model(s) can include, for example, a perception model (e.g., for use in an autonomous vehicle, such as autonomous vehicle 205). For example, the machine-learned model(s) can include models used to perform the perception 270A, prediction 270B, or motion planning 270C functions for an autonomous vehicle 205. In some implementations, the models can be trained by the one or more remote computing system(s) 290B, the operations computing system 290A, or any other device (e.g., remote servers, training computing systems, etc.) remote from or onboard the vehicle 205.

In some implementations, the training data can include a plurality of training sequences divided between multiple datasets (e.g., a training dataset, a validation dataset, or testing dataset). Each training sequence can include a plurality of map data, context information, perception data, etc. derived from or otherwise based on the simulated environmental data output by method 800 at 840. In some implementations, each sequence can include simulated LIDAR point clouds or simulated imagery from the perspective of a simulated sensor. For instance, in some implementations, a plurality of images can be scaled for training and evaluation.

At 950, the method 900B can include generating objective metric(s) for the machine-learned autonomous vehicle model(s) based on output(s) of at least a portion of the machine-learned autonomous vehicle model(s) in response to inputting the training instance (e.g., at 1030). For example, a computing system can generate the objective metric(s) for the machine-learned autonomous vehicle model(s) based on the output(s) of at least the portion of the machine-learned autonomous vehicle model(s) in response to the training instance. For example, in some implementations, one or more objective metric(s) can be determined by a comparison of training data on output(s) of at least a portion of the machine-learned autonomous vehicle model(s).

At 960, the method 900B can include modifying at least one parameter of at least a portion of the machine-learned autonomous vehicle model(s) based at least in part on at least one of the objective metric(s). For example, a computing system can modify at least the portion of the machine-learned autonomous vehicle model(s) based, at least in part, on at least one of the objective metric(s).

In some implementations, the machine-learned autonomous vehicle model(s) can be trained in an end-to-end manner. For example, in some implementations, the machine-learned autonomous vehicle model(s) can be fully differentiable.

Figure 10:
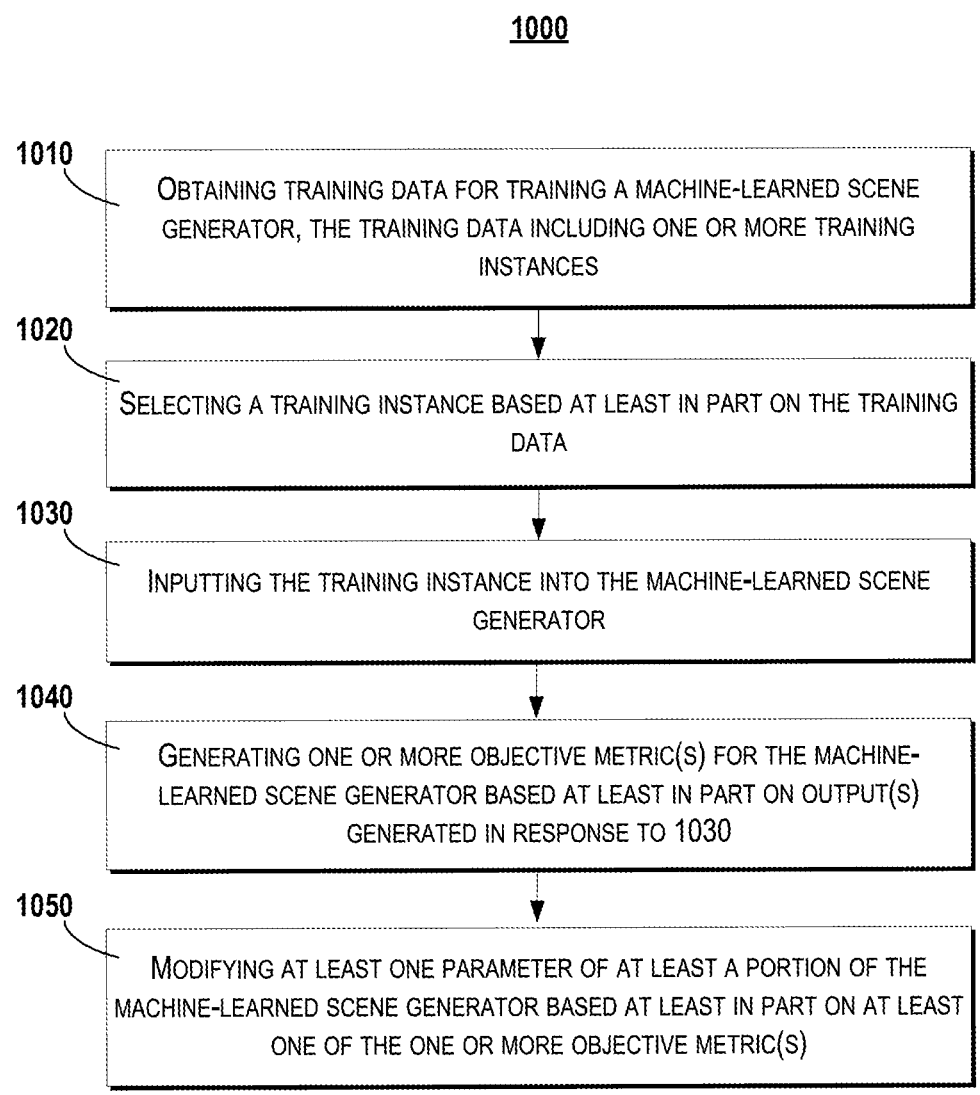
FIG. 10 is a flowchart of an example method for training a machine-learned model for simulated traffic scene generation, according to some implementations of the present disclosure.

FIG. 10 depicts a flowchart of a method 1000 for training one or more example machine-learned scene generator models (e.g., scene generator 410) according to aspects of the present disclosure. One or more portion(s) of the method 1000 can be implemented by a computing system that includes one or more computing devices such as, for example, the computing systems described with reference to the other figures (e.g., autonomous platform 105, vehicle computing system 210, operations computing system(s) 290A, remote computing system(s) 290B, system 400, a system of FIG. 11, etc.). Each respective portion of the method 1000 can be performed by any (or any combination) of one or more computing devices. Moreover, one or more portion(s) of the method 1000 can be implemented on the hardware components of the device(s) described herein (e.g., as in FIGS. 1, 2, 4, 5A to 5C, 6, 7, 11, etc.), for example, to train machine-learned models. FIG. 10 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 10 is described with reference to elements/terms described with respect to other systems and figures for exemplary illustrated purposes and is not meant to be limiting. One or more portions of method 1000 can be performed additionally, or alternatively, by other systems.

At 1010, the method 1000 can include obtaining training data for training a machine-learned scene generator (e.g., a model containing or otherwise implementing one or more portions of example system 400, such as a scene generator 410). For example, a computing system (e.g., autonomous platform 105, vehicle computing system 210, operations computing system(s) 290A, remote computing system(s) 290B, system 400, system of FIG. 11, etc.) can obtain (e.g., receive, generate, etc.) the training data for training the machine-learned scene generator. The training data can include a plurality of training instances, such as pre-recorded inputs (e.g., perception data, map data, etc.) corresponding to reference or "ground truth" scene data (e.g., recorded real-world environmental scenes, traffic scenes, etc.).

The training data can be collected using one or more autonomous platforms (e.g., autonomous platform 105) or the sensors thereof as the autonomous platform is within its environment. By way of example, the training data can be collected using one or more autonomous vehicle(s) (e.g., autonomous platform 105, autonomous vehicle 205, etc.) or sensors thereof as the vehicle(s) operates along one or more travel ways. In some examples, the training data can be collected using other sensors, such as mobile-device-based sensors, ground-based sensors, aerial-based sensors, satellite-based sensors, or substantially any sensor interface configured for obtaining and/or recording environmental scene data.

The training data can include a plurality of training sequences divided between multiple datasets (e.g., a training dataset, a validation dataset, or testing dataset). Each training sequence can include a plurality of map data, context information, pre-recorded perception data, etc. In some implementations, each sequence can include LIDAR point clouds (e.g., collected using LIDAR sensors of an autonomous platform) or high-definition map information (e.g., structured lane topology data). For instance, in some implementations, a plurality of images can be scaled for training and evaluation.

At 1020, the method 1000 can include selecting a training instance based at least in part on the training data. For example, a computing system can select the training instance based at least in part on the training data. In some implementations, the training instance can be based on reference scene data, such that the training instance can contain a set of initialized scene data 422 including a designated subject vehicle 308 and map data 424.

At 1030, the method 1000 can include inputting the training instance into the machine-learned scene generator. For example, a computing system can input the training instance into the machine-learned scene generator (e.g., scene generator 410).

At 1040, the method 1000 can include generating one or more loss metric(s) and/or one or more objective(s) for the machine-learned scene generator based on output(s) of at least a portion of the machine-learned scene generator in response to inputting the training instance (e.g., at 1030). For example, a computing system can generate the loss metric(s) and/or objective(s) for the machine-learned scene generator based on the output(s) of at least a portion of the machine-learned scene generator in response to the training instance. The loss metric(s), for example, can include a loss as described herein based at least in part on a probability determined for one or more objects and/or a scene containing the one or more objects. The objective(s), for example, can include an optimization (e.g., maximization) of a probability of a reference scene (e.g., an objective to increase the likelihood that the scene generator 410 can generate scenes corresponding to the reference scenes, such as real-world scenes) as discussed herein.

At 1050, the method 1000 can include modifying at least one parameter of at least a portion of the machine-learned scene generator based at least in part on at least one of the loss metric(s) and/or at least one of the objective(s). For example, a computing system can modify at least a portion of the machine-learned scene generator based at least in part on at least one of the loss metric(s) and/or at least one of the objective(s).

In some implementations, the machine-learned model framework can be trained in an end-to-end manner. For example, in some implementations, the machine-learned model framework can be fully differentiable.

Figure 11:
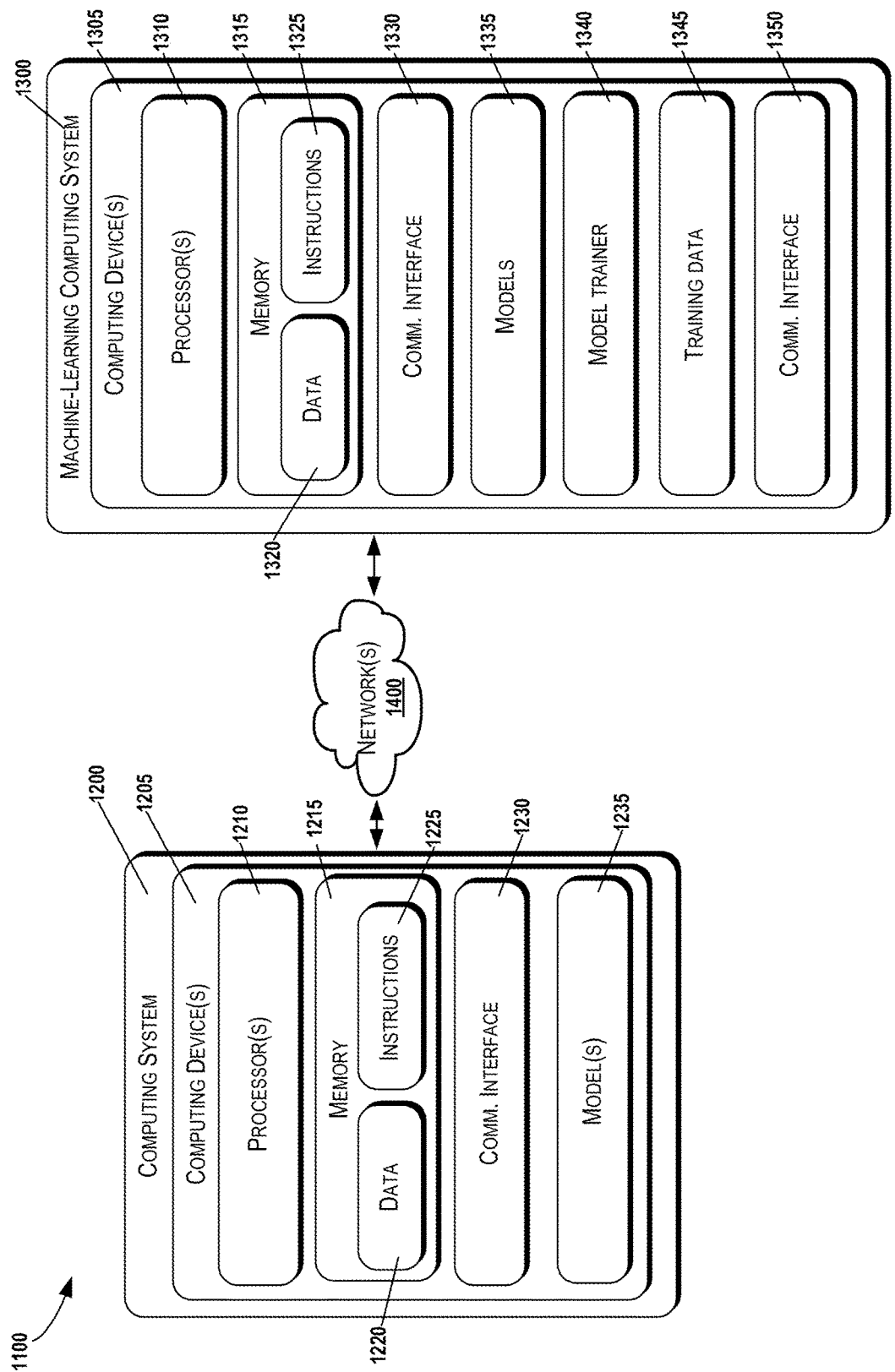
FIG. 11 is a block diagram of a computing system for simulated traffic scene generation, according to some implementations of the present disclosure.

FIG. 11 is a block diagram of an example computing system 1100, according to some embodiments of the present disclosure. The example system 1100 includes a computing system 1200 and a machine-learning computing system 1300 that are communicatively coupled over one or more networks 1400.

In some implementations, the computing system 1200 can perform one or more observation tasks such as, for example, by obtaining sensor data (e.g., two-dimensional, three-dimensional, etc.). In some implementations, the computing system 1200 can be included in an autonomous platform. For example, the computing system 1200 can be on-board an autonomous vehicle. In other implementations, the computing system 1200 is not located on-board an autonomous platform. The computing system 1200 can include one or more distinct physical computing devices 1205.

The computing system 1200 (or one or more computing device(s) 1205 thereof) can include one or more processors 1210 and a memory 1215. The one or more processors 1210 can be any suitable processing device (e.g., a processor core, a microprocessor, an ASIC, a FPGA, a controller, a microcontroller, etc.) and can be one processor or a plurality of processors that are operatively connected. The memory 1215 can include one or more non-transitory computer-readable storage media, such as RAM, ROM, EEPROM, EPROM, one or more memory devices, flash memory devices, etc., and combinations thereof.

The memory 1215 can store information that can be accessed by the one or more processors 1210. For instance, the memory 1215 (e.g., one or more non-transitory computer-readable storage mediums, memory devices) can store data 1220 that can be obtained, received, accessed, written, manipulated, created, or stored. The data 1220 can include, for instance, sensor data, two-dimensional data, three-dimensional, image data, LIDAR data, model parameters, simulation data (e.g., simulated environmental scenes, simulate sensor data obtained therefrom, trajectory data, contextual data, potential trajectories, sampled trajectories, probability data, or any other data or information described herein. In some implementations, the computing system 1200 can obtain data from one or more memory device(s) that are remote from the computing system 1200.

The memory 1215 can also store computer-readable instructions 1225 that can be executed by the one or more processors 1210. The instructions 1225 can be software written in any suitable programming language or can be implemented in hardware. Additionally, or alternatively, the instructions 1225 can be executed in logically or virtually separate threads on processor(s) 1210.

For example, the memory 1215 can store instructions 1225 that when executed by the one or more processors 1210 cause the one or more processors 1210 (the computing system 1200) to perform any of the operations, functions, or methods/processes described herein, including, for example, generating simulated environmental scenes (and/or generating simulated sensor data therefrom) such as by implementing a scene generator 410, etc.

According to an aspect of the present disclosure, the computing system 1200 can store or include one or more machine-learned models 1235. As examples, the machine-learned models 1235 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the computing system 1200 can include one or more models of a scene generator 410.

In some implementations, the computing system 1200 can receive the one or more machine-learned models 1235 from the machine-learning computing system 1300 over network(s) 1400 and can store the one or more machine-learned models 1235 in the memory 1215. The computing system 1200 can then use or otherwise implement the one or more machine-learned models 1235 (e.g., by processor(s) 1210). In particular, the computing system 1200 can implement the machine-learned model(s) 1235 to obtain simulated environmental scenes, obtain simulated sensor data obtained therefrom, train one or more systems of an autonomous vehicle therewith, etc.

The machine learning computing system 1300 can include one or more computing devices 1305. The machine learning computing system 1300 can include one or more processors 1310 and a memory 1315. The one or more processors 1310 can be any suitable processing device (e.g., a processor core, a microprocessor, an ASIC, a FPGA, a controller, a microcontroller, etc.) and can be one processor or a plurality of processors that are operatively connected. The memory 1315 can include one or more non-transitory computer-readable storage media, such as RAM, ROM, EEPROM, EPROM, one or more memory devices, flash memory devices, etc., and combinations thereof.

The memory 1315 can store information that can be accessed by the one or more processors 1310. For instance, the memory 1315 (e.g., one or more non-transitory computer-readable storage mediums, memory devices) can store data 1320 that can be obtained, received, accessed, written, manipulated, created, or stored. The data 1320 can include, for instance, sensor data, two-dimensional data, three-dimensional, image data, LIDAR data, model parameters, map data, simulation data, simulated environmental scenes, simulated sensor data, or any other data or information described herein. In some implementations, the machine learning computing system 1300 can obtain data from one or more memory device(s) that are remote from the machine learning computing system 1300.

The memory 1315 can also store computer-readable instructions 1325 that can be executed by the one or more processors 1310. The instructions 1325 can be software written in any suitable programming language or can be implemented in hardware. Additionally, or alternatively, the instructions 1325 can be executed in logically or virtually separate threads on processor(s) 1310.

For example, the memory 1315 can store instructions 1325 that when executed by the one or more processors 1310 cause the one or more processors 1310 (the computing system) to perform any of the operations or functions described herein, including, for example, generating simulated environmental scenes (and/or generating simulated sensor data therefrom) such as by implementing a scene generator 410, training an environmental scene generator (e.g., scene generator 410), training one or more systems of an autonomous vehicle with simulated traffic scenes, etc., according to example aspects of the present disclosure.

In some implementations, the machine learning computing system 1300 includes one or more server computing devices. If the machine learning computing system 1300 includes multiple server computing devices, such server computing devices can operate according to various computing architectures, including, for example, sequential computing architectures, parallel computing architectures, or some combination thereof.

In addition, or alternatively to the model(s) 1235 at the computing system 1200, the machine learning computing system 1300 can include one or more machine-learned models 1335. As examples, the machine-learned models 1335 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the computing system 1200 can include one or more models of a scene generator 410.

In some implementations, the machine learning computing system 1300 or the computing system 1200 can train the machine-learned models 1235 or 1335 through use of a model trainer 1340. The model trainer 1340 can train the machine-learned models 1235 or 1335 using one or more training or learning algorithms. One example training technique is backwards propagation of errors. In some implementations, the model trainer 1340 can perform supervised training techniques using a set of labeled training data. In other implementations, the model trainer 1340 can perform unsupervised training techniques using a set of unlabeled training data. By way of example, the model trainer 1340 can train a machine-learned scene generator model (and/or a machine-learned autonomous vehicle model, using simulated training data obtained from the machine-learned scene generator model) through unsupervised energy minimization training techniques using an objective function (e.g., an objective as described herein). The model trainer 1340 can perform a number of generalization techniques to improve the generalization capability of the models being trained. Generalization techniques include weight decays, dropouts, or other techniques.

The computing system 1200 and the machine learning computing system 1300 can each include a communication interface 1230 and 1350, respectively. The communication interfaces 1230/1350 can be used to communicate with one or more systems or devices, including systems or devices that are remotely located from the computing system 1200 and the machine learning computing system 1300. A communication interface 1230/1350 can include any circuits, components, software, etc. for communicating with one or more networks (e.g., 1400). In some implementations, a communication interface 1230/1350 can include, for example, one or more of a communications controller, receiver, transceiver, transmitter, port, conductors, software or hardware for communicating data.

The network(s) 1400 can be any type of network or combination of networks that allows for communication between devices. In some embodiments, the network(s) can include one or more of a local area network, wide area network, the Internet, secure network, cellular network, mesh network, peer-to-peer communication link or some combination thereof and can include any number of wired or wireless links. Communication over the network(s) 1400 can be accomplished, for instance, through a network interface using any type of protocol, protection scheme, encoding, format, packaging, etc.

FIG. 11 illustrates one example system 1100 that can be used to implement the present disclosure. Other systems can be used as well. For example, in some implementations, the computing system 1200 can include the model trainer 1340 and the training data 1345. In such implementations, the machine-learned models 1335 can be both trained and used locally at the computing system 1200. As another example, in some implementations, the computing system 1200 is not connected to other computing systems.

In addition, components illustrated or discussed as being included in one of the computing systems 1200 or 1300 can instead be included in another of the computing systems 1200 or 1300.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein. Also, terms such as "based on" should be understood as "based at least in part on".

Those of ordinary skill in the art, using the disclosures provided herein, will understand that the elements of any of the claims discussed herein can be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of operations. For instance, letter identifiers such as (a), (b), (c), . . . , (i), (ii), (iii), . . . , etc. may be used to illustrate method operations. Such identifiers are provided for the ease of the reader and do not denote a particular order of steps or operations. An operation illustrated by a list identifier of (a), (i), etc. can be performed before, after, and/or in parallel with another operation illustrated by a list identifier of (b), (ii), etc."

What is claimed is:

1. A computer-implemented method for traffic scene generation, comprising:
    (a) obtaining environmental data descriptive of an environment, a subject vehicle within the environment, and an object set within the environment;
    (b) sampling a plurality of parameters of a new object, wherein the plurality of parameters are sampled respectively from a plurality of probability distributions sequentially generated by a machine-learned traffic scene generation model and based at least in part on the environmental data, at least one of the plurality of probability distributions being conditioned upon one or more of the plurality of probability distributions that were previously sequentially generated;
    (c) updating the environmental data by adding the new object to the object set; and
    (d) outputting the environmental data descriptive of a synthesized traffic scene.

2. The computer-implemented method of claim 1, further comprising:
    iteratively performing (b) and (c) for a plurality of iterations to obtain a plurality of new objects,
    wherein each of the plurality of new objects is obtained based at least in part on the environmental data updated by a prior iteration of the plurality of iterations.

3. The computer-implemented method of claim 2, wherein, for a final iteration of the plurality of iterations, the plurality of parameters comprise an end token that, when sampled, results in termination of the plurality of iterations.

4. The computer-implemented method of claim 1, wherein the machine-learned traffic scene generation model is configured to determine a joint probability distribution of the synthesized traffic scene over the object set conditioned on the subject vehicle.

5. The computer-implemented method of claim 4, wherein the joint probability distribution is autoregressively factorized and comprises the plurality of probability distributions.

6. The computer-implemented method of claim 4, wherein the machine-learned traffic scene generation model has been trained by optimizing a likelihood of real-world traffic scenes contained in a training dataset.

7. The computer-implemented method of claim 1, wherein the machine-learned traffic scene generation model comprises:
    a shared backbone feature extraction portion that extracts features from the environmental data; and
    a plurality of prediction models that respectively generate the plurality of probability distributions based at least in part on the features.

8. The computer-implemented method of claim 1, wherein the environmental data comprises a collection of polygons and polylines that provide semantic priors for a region of interest around the subject vehicle.

9. The computer-implemented method of claim 1, wherein the environmental data comprises a multi-channel image encoding of a top-down view of the environment.

10. The computer-implemented method of claim 1, wherein the plurality of parameters comprise one or more of: an object class, an object position, an object bounding box, or an object velocity.

11. The computer-implemented method of claim 1, wherein the machine-learned traffic scene generation model comprises an autoregressive model comprising a convolutional long short-term memory neural network.

12. The computer-implemented method of claim 1, further comprising:
- (e) generating simulated sensor data for the environment based on the environmental data output at (d);
- (f) obtaining labels for the simulated sensor data that correspond to the plurality of parameters; and
- (g) training one or more machine-learned models of an autonomous vehicle control system using the labels and the simulated sensor data.

13. A computing system for traffic scene generation, the computing system comprising:
one or more processors; and
one or more non-transitory computer-readable media that collectively store instructions that, when executed by the one or more processors, cause the computing system to perform operations, the operations comprising:
- (a) obtaining environmental data descriptive of an environment, a subject vehicle within the environment, and an object set within the environment;
- (b) for one or more iterations, sampling a plurality of parameters of a new object, wherein the plurality of parameters are sampled respectively from a plurality of probability distributions sequentially generated by a machine-learned traffic scene generation model and based at least in part on the environmental data, at least one of the plurality of probability distributions being conditioned upon one or more of the plurality of probability distributions that were previously sequentially generated;
- (c) for each of the one or more iterations, updating the environmental data by adding the new object to the object set; and
- (d) after the one or more iterations, providing, as an output, the environmental data descriptive of a synthesized traffic scene.

14. The computing system of claim 13, wherein the machine-learned traffic scene generation model is configured to determine a joint probability distribution of the synthesized traffic scene over the object set conditioned on the subject vehicle.

15. The computing system of claim 13, wherein, for a final iteration of the one or more iterations, the plurality of parameters comprise an end token that, when sampled, results in termination of the one or more iterations.

16. The computing system of claim 13, wherein the machine-learned traffic scene generation model comprises:
a shared backbone feature extraction portion that extracts features from the environmental data; and
a plurality of prediction models that respectively generate the plurality of probability distributions based at least in part on the features.

17. The computing system of claim 13, wherein the operations further comprise:
- (e) generating simulated sensor data for the environment based on the environmental data output at (d);
- (f) obtaining labels for the simulated sensor data that correspond to the plurality of parameters; and
- (g) training one or more machine-learned models of an autonomous vehicle control system using the labels and the simulated sensor data.

18. An autonomous vehicle control system comprising:
one or more machine-learned models that have been trained using simulated sensor data representing at least a portion of a synthesized traffic scene, the simulated sensor data having been generated by performance of operations, the operations comprising:
- (a) obtaining environmental data descriptive of an environment, a subject vehicle within the environment, and an object set within the environment;
- (b) for one or more iterations, sampling a plurality of parameters of a new object, wherein the plurality of parameters are sampled respectively from a plurality of probability distributions sequentially generated by a machine-learned traffic scene generation model and based at least in part on the environmental data, at least one of the plurality of probability distributions being conditioned upon one or more of the plurality of probability distributions that were previously sequentially generated;
- (c) for each of the one or more iterations, updating the environmental data by adding the new object to the object set; and
- (d) generating the simulated sensor data based on the environmental data updated at (c).

19. The autonomous vehicle control system of claim 18, wherein the machine-learned traffic scene generation model is configured to determine a joint probability distribution of the synthesized traffic scene over the object set conditioned on the subject vehicle.

20. The autonomous vehicle control system of claim 19, wherein the machine-learned traffic scene generation model comprises:
a shared backbone feature extraction portion that extracts features from the environmental data; and
a plurality of prediction models that respectively generate the plurality of probability distributions based at least in part on the features, the plurality of probability distributions autoregressively factorizing the joint probability distribution.

* * * * *